US012438618B2

(12) United States Patent
Fryman et al.

(10) Patent No.: US 12,438,618 B2
(45) Date of Patent: Oct. 7, 2025

(54) PSEUDO-MONOLITHIC DATA COMMUNICATION SYSTEM

(71) Applicant: Intel Corporation, Santa Clara, CA (US)

(72) Inventors: Joshua Bruce Fryman, Corvallis, OR (US); Khaled Ahmed, San Jose, CA (US); James E. Jaussi, El Dorado Hills, CA (US); Sergey Yuryevich Shumarayev, Los Altos Hills, CA (US)

(73) Assignee: Intel Corporation, Santa Clara, CA (US)

( * ) Notice: Subject to any disclaimer, the term of this patent is extended or adjusted under 35 U.S.C. 154(b) by 866 days.

(21) Appl. No.: 17/485,358

(22) Filed: Sep. 25, 2021

(65) Prior Publication Data
US 2023/0097800 A1 Mar. 30, 2023

(51) Int. Cl.
*H04B 10/50* (2013.01)
*H04B 10/80* (2013.01)
*H10H 20/85* (2025.01)
*H10H 20/855* (2025.01)

(52) U.S. Cl.
CPC ......... *H04B 10/502* (2013.01); *H04B 10/801* (2013.01); *H10H 20/8506* (2025.01); *H10H 20/855* (2025.01)

(58) Field of Classification Search
CPC ..................................................... H04B 10/27
See application file for complete search history.

(56) References Cited

U.S. PATENT DOCUMENTS

2019/0295992 A1 9/2019 Ahmed et al.
2021/0208337 A1* 7/2021 Pezeshki .................. G02B 6/43
2021/0320718 A1* 10/2021 Kalman ................. H04B 10/40

OTHER PUBLICATIONS

Cheng, Chao-Ching et al., "Monolithic Heterogeneous Integration of BEOL Power Grating Transistors of Carbon Nanotube Networks with FEOL Si Ring Oscillator Circuits," IEEE 2019 978-1-7281-4032-2/19 (4 pages).
Fujiwara, Hirokazu et al., "Surrounding Gate Vertical-Channel FET with a Gate Length of 40 nm Using BEOL-Compatible High-Thermal-Tolerance In—Al—Zn Oxide Channel," IEEE Transactions on Electron Devices, vol. 67, No. 12, Dec. 2020 (7 pages).
Kaneko, K. et al., "Highly Reliable BEOL-Transistor with Oxygen-controlled InGaZnO and Gate/Drain Offset Design for High/Low Voltage Bridging I/O Operations," 978-1-4557-0505-2/11 IEEE 2011 (4 pages).
Kaneko, Kishou et al., "A Novel BEOL Transistor (BETr) with InGaZnO Embedded in Cu-Interconnects for on-chip High Voltage I/Os in Standard CMOS LSIs," 2011 Symposium on VLSI Technology Digest of Technical Papers (2 pages).
Dota, Masashi et al., "3D-Stacked CAAC-In—Ga—Zn Oxide FETs with Gate Length of 72 nm," IEEE 2019 978-1-7281-4032-2/19 (4 pages).

(Continued)

*Primary Examiner* — David W Lambert
(74) *Attorney, Agent, or Firm* — Alliance IP, LLP

(57) ABSTRACT

An apparatus comprising a chip comprising a plurality of micro-emitters, the micro-emitters to couple to a plurality of data lines and to an optical fiber, wherein the micro-emitters are to generate optical signals for parallel transmission through the optical fiber, the optical signals corresponding to data communicated on the data lines.

20 Claims, 10 Drawing Sheets

(56) References Cited

OTHER PUBLICATIONS

Schuette, Michael et al., "Heterogeneous Integration of low-temperature metal-oxide TFTs," Proceedings of SPIE 10105, Oxide-Based Materials and Devices VIII, 1010512 (Feb. 24, 2017) (8 pages).

Yu, Ming-Jiue et al., "High-Voltage Amorphous InGaZnO TFT With A1203 High-k Dielectric for Low-Temperature Monolithic 3-D Integration," IEEE Transactions on Electron Devices, vol. 63, No. 10, Oct. 2016 (6 pages).

\* cited by examiner

PSEUDO-MONOLITHIC DATA COMMUNICATION SYSTEM

BACKGROUND

An optoelectronic system may transmit data using optical signals. The optical signals may include visible light waves or other waves (e.g., ultraviolet or infrared). An optoelectronic system may comprise a transceiver that may convert electrical signals to optical signals and transmit the optical signals across a medium. The transceiver may also receive optical signals over a medium and convert the optical signals to electrical signals.

DETAILED DESCRIPTION

Figure 1A:
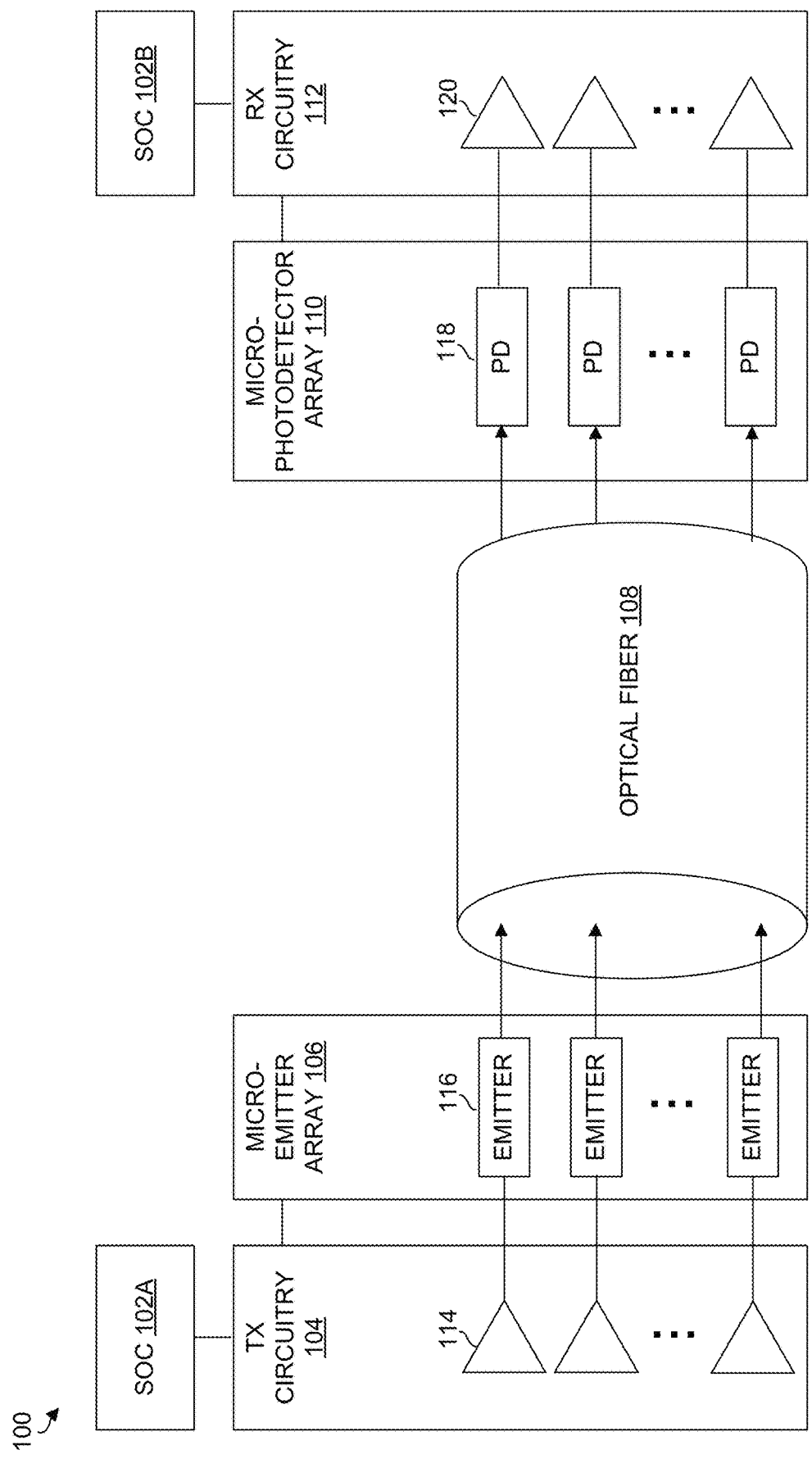
FIG. 1A depicts a system comprising micro-emitters for parallel optical communication in accordance with any of the embodiments disclosed herein.

FIG. 1A depicts a system 100 comprising micro-emitters for parallel optical communication in accordance with any of the embodiments disclosed herein. System 100 includes a system on a chip (SOC) 102A coupled to transmitter (TX) circuitry 104. The SOC 102A generates data to be transmitted to SOC 102B. The SOC 102A provides the data to TX circuitry 104, which drives the micro-emitters 116 of the micro-emitter array 106 based on the data. The micro-emitter array 106 generates optical signals to be transmitted through optical fiber 108 to a micro-photodetector array 110. The micro-photodetector array 110 (which may comprise a plurality of micro-photodetectors 118) converts the optical signals to electrical signals which are processed by receiver (RX) circuitry 112 and then provided to SOC 102B.

To address the challenges of future input/output (IO) demand at the package level, a next-generation optical or waveguide (e.g., mmWave) media may be used in place of a standard electrical interface. While laser-based photonics have many uses, micro-emitter optical communication arrays may offer one or more advantages, e.g., in terms of cooling, complexity, power, and cost in large scale deployment.

Various embodiments of the present disclosure provide systems utilizing various co-packaging techniques to integrate a micro-emitter array and/or a micro-photodetector array with a primary chip, such as an SOC or other chip (e.g., a processor unit or memory chip, or other standard logic device or mixed-signal device). Various systems described herein may be referred to as pseudo-monolithic data communication systems (although the term pseudo-monolithic is not meant to limit embodiments of the disclosure, including the claimed embodiments), as all of the components used for parallel optical communication are integrated together on the same package, despite not all being manufactured together using the same process on the same substrate. This disclosure also contemplates data communication systems in which all of the components used for parallel optical communication could be manufactured on the same substrate using the same manufacturing process.

In some embodiments, the micro-emitters may be fabricated on a first wafer using a process that is different from the process used to fabricate the primary chip and then may be transferred onto the primary chip (or other chip coupling the primary chip to the micro-emitter array, such as any of the chips shown in the FIGS. herein). For example, during the fabrication of the micro-emitters, higher temperatures (e.g., sometimes exceeding 1000 degrees) may be used to fabricate the material of interest (e.g., gallium nitride micro-LEDs) than are used during the fabrication of the primary chip. Similarly, in some embodiments, the micro-photodetectors may be fabricated on a wafer using a process that is different from the process used to fabricate the primary chip and then may be transferred onto the primary chip (or other chip coupling the primary chip to the micro-photodetector array, such as any of the chips shown in the FIGS. herein or corresponding receive side chips).

In various embodiments, the micro-emitters and/or micro-photodetectors may be on dedicated chips that are then coupled to the primary chip directly or through one or more intermediary chips as described herein.

The use of micro-emitters to communicate may bring some complexity to co-packaging or other integration with standard devices, but the relatively low power requirements create new packaging opportunities. These new packaging arrangements, in various embodiments, may result in one or more of an improvement in overall system design, a reduction in complexity, higher yields, and lower cost.

TX circuitry 104 may comprise any suitable circuitry to convert electrical signals representing data in a format used by an interconnect fabric of an SOC 102 or other chip to electrical signals suitable to drive the micro-emitter array 106. The SOC 102 or other chip may communicate using any suitable protocol, such as a dynamic random-access memory (DRAM)/High Bandwidth Memory (HBM), Peripheral Component Interconnect Express (PCIe), Compute Express Link (CXL), Ultra Path Interconnect (UPI), multiple die fabric interconnect (MDFI), Advanced Interface Bus (AM), or other suitable communication protocol.

In various embodiments, TX circuitry 104 may comprise drive circuitry to convert voltage and/or current levels of data signals communicated by the SOC 102 to voltage and/or current levels suitable to cause the micro-emitters 116 to emit light in the desired manner. In the embodiment depicted, TX circuitry 104 comprises a plurality of drivers 114 (e.g., transconductance amplifiers that convert voltage differentials into currents). For example, a first driver 114 may be coupled to a first emitter 116 to drive the first emitter, a second driver 114 may be coupled to a second emitter 116 to drive the second emitter, and so on.

In some embodiments, TX circuitry 104 may comprise any other suitable circuitry to facilitate transmission of signals to the micro-emitter array 106, such as clocking circuitry, serializers, deserializers, voltage conversion circuitry, charge pumps, or other suitable circuitry.

Micro-emitter array 106 comprises an array of micro-emitters 116. A micro-emitter 116 may receive an electrical signal from TX circuitry 104 and convert it to an optical signal to be transmitted by optical fiber 108. A micro-emitter may comprise any suitable device for emitting waves (e.g., in a direction normal to a surface of the micro-emitter array 106). In various examples, a micro-emitter 116 may comprise a micro-light emitting diode (micro-LED), organic LED (OLED), quantum dot LED (QLED), vertical-cavity surface-emitting laser (VCSEL), micro-resonant cavity LED (micro-RCLED), nanowire LED, nanopyramid LED, other type of micro-pixel, or a stack of micro-LED and a color conversion quantum dot film. In some embodiments, the micro-emitter may comprise a self-illuminating inorganic diode. Various aspects of the present disclosure may be applied to micro-LED techniques, or other many-waveguide transmission channels.

Conventional emitters (e.g., LEDs) are typically of a size on the order of hundreds of microns. In contrast, a micro-emitter may have a size (e.g., diameter or other longest cross section) on the order of tens of microns or less. In some embodiments, a micro-emitter 116 may be in the micrometer range (e.g., less than 10 micrometers in diameter or other longest cross section). In some embodiments, the micro-emitters may be placed close to each other in an array having a very small size (e.g., 0.1-0.5 millimeters×0.1-0.5 millimeters).

Micro-emitters 116 may be manufactured on a substrate comprising any suitable materials, such as a glass substrate, a silicon substrate, or other suitable substrate. In one example, micro-emitters 116 may be manufactured on a glass substrate using P-channel metal-oxide-semiconductor (PMOS) flows (e.g., with a 200 mm wafer).

In various embodiments, when micro-emitters are manufactured, they may be grown on a wafer, then the wafer may be flipped and the micro-emitters may be transfer printed (e.g., through ablation) onto a different wafer. Thus, in some embodiments, the substrate on which the micro-emitters 116 are ultimately placed is a substrate different from the substrate upon which the micro-emitters are manufactured. In other embodiments, the micro-emitters 116 are grown directly on a wafer and then the wafer is stacked on and fused to another wafer (e.g., comprising the TX circuitry 104 and/or RX circuitry 112). The micro-emitters 116 may then be routed to the drivers 114 using through silicon vias (TSVs) or through glass vias (TGVs).

Optical fiber 108 represents one or more optical fibers (e.g., an uncoupled or coupled multicore optical fiber) to carry optical signals provided by the micro-emitter array 106 to the photodetector array 110. In various embodiments, optical fiber 108 may transport a parallel transmission of data. For example, an optical fiber 108 may comprise multiple cores with a respective core carrying optical signals corresponding to data of a respective data line, thus the multiple cores of the optical fiber may simultaneously transport optical signals corresponding to data of multiple data lines in parallel.

Micro-photodetector array 110 may comprise an array of micro-photodetectors 118 to convert optical signals received via optical fiber 108 to electrical signals. A micro-photodetector 118 may comprise any suitable device to convert an optical signal to an electrical signal, such as a semiconductor photodetector (sometimes referred to as a photodiode), comprising any suitable material such as silicon, germanium, GaAs, GaN, or InGaAs. In various embodiments, a photodetector 118 comprises an avalanche photodetector (APD), PIN photodetector, or other suitable type of photodetector. In some embodiments, the number of micro-photodetectors in the array 110 may be equal to the number of the micro-emitters 116.

A micro-photodetector 118 may have any suitable size (e.g., diameter or other longest cross section), such as on the order of tens of microns or less, or less than ten microns. In some embodiments, the micro-photodetectors 118 may be placed close to each other in an array having a very small size (e.g., 0.1-0.5 millimeters×0.1-0.5 millimeters).

Micro-photodetectors 118 may be manufactured on a substrate comprising any suitable materials, such as a glass substrate, a silicon substrate, or other suitable substrate.

In various embodiments, when micro-photodetectors are manufactured, they may be manufactured on a wafer and then transferred onto a different wafer. Thus, in some embodiments, the substrate on which the micro-photodetectors 118 are ultimately placed is a substrate different from the substrate upon which the micro-photodetectors are manufactured. For example, micro-photodetectors (e.g., GaN nanowire photodetectors or GaN micro-LEDs which may function as micro-photodectors) may be fabricated on a first chip and then transferred to a CMOS chip comprising receiver circuitry (e.g., transimpedance amplifiers and/or other detection circuits). Various such embodiments may have some advantages over silicon based photodetectors that are built with a CMOS process flow on the same substrate as the receiver circuitry (e.g., transimpedance amplifiers) (although such photodetectors are also contemplated by this disclosure). For example, when the micro-photodetectors are transferred on top of a transimpedance amplifier backplane, then the area of the chip comprising the receiver circuitry may be reduced.

In other embodiments, the micro-photodetectors 118 are manufactured on a wafer and then the wafer is stacked on and fused to another wafer (e.g., comprising the TX circuitry 104 and/or RX circuitry 112). The micro-photodetectors 118 may then be routed to the amplifiers 120 or other receiver circuitry using through silicon vias (TSVs) or through glass vias (TGVs).

In some embodiments, the micro-emitters 116 and the micro-photodetectors 118 are manufactured on the same wafer as TX circuitry 104 and/or RX circuitry 112 using the same process. This chip may be the SoC or other processor unit or may be a chip that is coupled to the SoC or other processor unit.

RX circuitry 112 may comprise circuitry to amplify and/or otherwise process electrical signals generated by the micro-photodetector array 110. In the depicted embodiment, such circuitry includes amplifiers 120, such as transimpedance amplifiers that amplify the photocurrents detected by the photodetectors. RX circuitry 112 may comprise any other suitable circuitry to process the received electrical signals, such as sampling circuitry (e.g., sense-amplifiers), clocking circuitry, serializers, deserializers, voltage conversion circuitry, charge pumps, or other suitable circuitry.

Figure 1B:
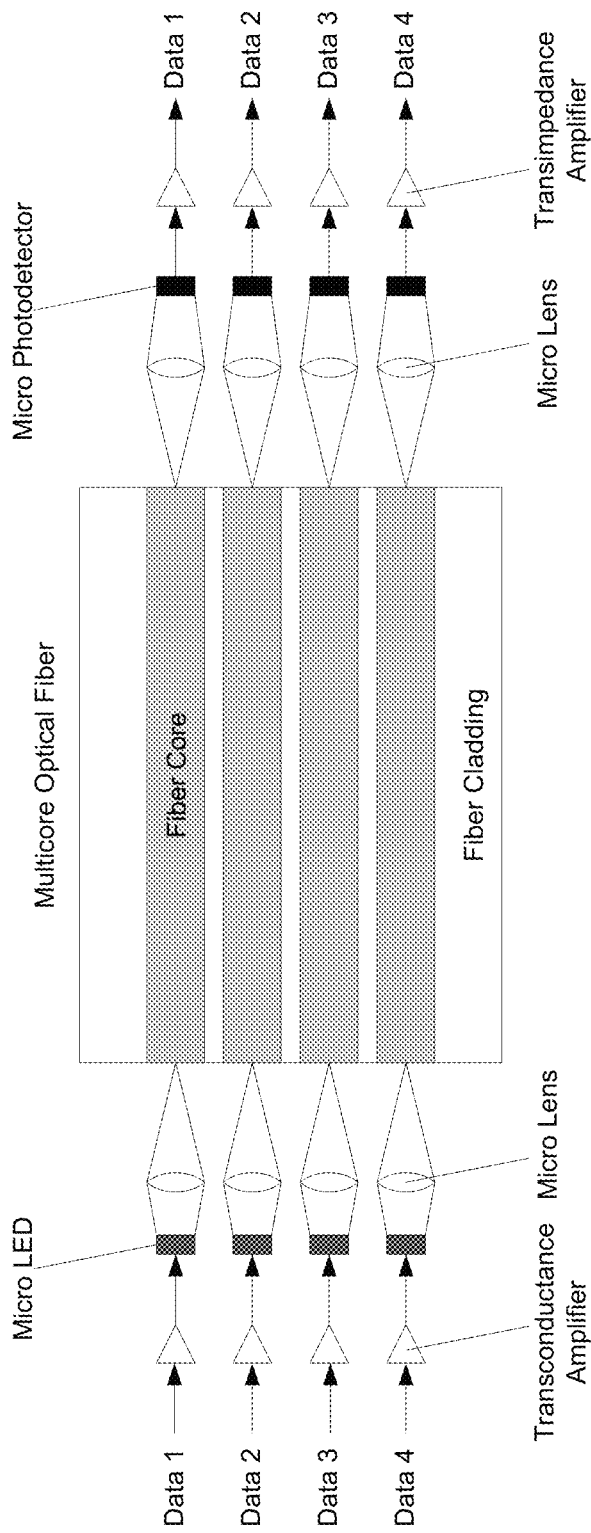
FIG. 1B depicts a system comprising micro-light emitting diodes (LEDs) for parallel optical communication in accordance with any of the embodiments disclosed herein.

FIG. 1B depicts a system comprising micro-light emitting diodes (LEDs) for parallel optical communication in accordance with any of the embodiments disclosed herein. This embodiment is one possible implementation of the system of FIG. 1A (and any aspects of FIG. 1B may be applied to the various embodiments of system 100). In this embodiment, data lines (Data 1 through Data 4) feed into transconductance amplifiers and then to micro-LEDs (one possible implementation of the micro-emitters 116). The light waves emitted by the micro-LEDs may each pass through a respective micro-lens and a fiber core of the multicore optical fiber.

On the receive side, the optical signals may each pass through a respective micro-lens to a respective micro-photodetector. The signal output by a micro-photodetector may then be amplified by a transimpedance amplifier and provided on a respective data line (e.g., to a chip that will utilize the data).

In various embodiments, the micro-lenses may be implemented in any suitable manner. For example, in one embodiment, the micro-lenses are coupled to the fiber (e.g., in a lensed fiber configuration); in another embodiment, the micro-lenses are coupled to the micro-LEDs; in yet another embodiment, a separate micro-lens enclosure may connect a micro-LED and fiber core with small free-space and/or physical contact coupling. In some embodiments, a thin metasurface optical element (e.g., ~200 nm thick) may be built on the micro-emitter 116 to couple the light efficiently to the fiber. Similarly, a thin metasurface optical element (e.g., ~200 nm thick) may be built on the surface of the micro-photodetector to couple light from the fiber into the micro-photodetector.

FIGS. 2-10 depict various packaging arrangements for systems comprising micro-emitters for parallel optical communication. For example, the primary integrated circuit chips shown in FIGS. 2-10 may include an SoC 102A, other processor unit, memory chip, or other circuitry on a chip to generate and communicate electrical signals representing data to be communicated over the optical fiber (e.g., to another integrated circuit chip). The complementary metal-oxide-semiconductor (CMOS) TX chips depicted may comprise at least a portion of the TX circuitry 104 (in other embodiments, one or more components or portions of components described herein as part of the TX circuitry 104 may be included on another component of FIGS. 2-10, such as a primary chip, a bridge, a chip comprising the micro-emitter array 106, or other component). Micro-emitter array 106 may be included within a micro-emitter array depicted in FIGS. 2-10.

Although, the packaging arrangements represented in FIGS. 2-10 focus on the co-packaging of a primary chip (e.g., 102A), TX circuitry 104, and micro-emitter array 106, the co-packaging techniques may also be applied to the co-packaging of a primary chip (e.g., 102B), RX circuitry 112, and a photodetector array 110. For example, in FIGS. 2-10 and the accompanying disclosure, references to micro-emitter arrays may alternatively apply to micro-photodetector arrays and references to components comprising TX circuitry may alternatively apply to components comprising RX circuitry. Thus, for example, receiver based packaging arrangements could include CMOS RX chips and/or micro-photodetector arrays in place of the illustrated CMOS RX chips and/or micro-emitter arrays.

In various embodiments, a primary chip may be placed on the same package with TX circuitry 104 and micro-emitter array 106 as well as a micro-photodetector array 110 and RX circuitry 112 (e.g., using any of the packaging arrangements described herein) so that the primary chip may send data to be transmitted through micro-emitter array 106 and receive data via micro-photodetector array 110.

Figure 2:
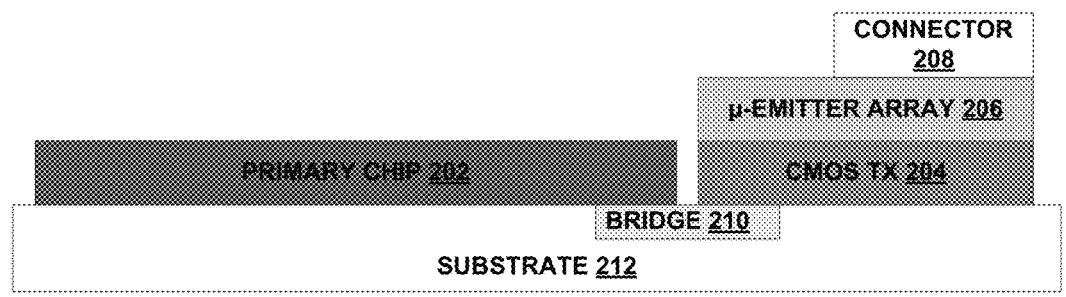
FIG. 2 depicts a packaging arrangement of a primary chip and a micro-emitter array, in accordance with any of the embodiments disclosed herein.

FIG. 2 depicts a packaging arrangement of a primary integrated circuit chip 202 and a micro-emitter array 206, in accordance with any of the embodiments disclosed herein. In the embodiment depicted, primary chip 202 is coupled to CMOS TX chip 204 through bridge 210. A micro-emitter array chip 206 is placed on top of (and is fused to) the CMOS TX chip 204 and a connector 208 is placed on top of the micro-emitter array chip 206.

As alluded to above, primary integrated circuit chip 202 may include an SOC (e.g., 102A), other processor unit, memory chip, or other circuitry on a chip to generate electrical signals indicative of data to be communicated to another integrated circuit chip.

The primary chip 202 may be coupled to a substrate 212 (e.g., via a flip chip technique, wire bonding, and/or other suitable couplings). The substrate may comprise any organic or inorganic materials.

Bridge 210 may comprise a chip with conductive material (e.g., a plurality of metal layers) to provide connections between pads of the primary chip 202 and pads of the CMOS TX chip 204. In one embodiment, bridge 210 is an embedded multi-die interconnect bridge (EMIB). In various embodiments, an EMIB is a small silicon chip embedded in the package substrate 212 under the edges of the chips the EMIB couples together. In some embodiments, an EMIB may couple pads of a chip to pads of another chip without using TSVs. In various embodiments, a plurality of EMIBs may be embedded in a single substrate 212, each EMIB coupling two chips together.

Although various chips in the FIGS. herein are shown as being coupled through one or more bridges, in other embodiments the chips may be coupled together in a package in other suitable manners. For example, two chips may be coupled together through TSVs and an interposer (e.g., a silicon interposer) that sits on top of a package substrate.

CMOS TX chip 204 may include the TX circuitry 104 discussed above, or a portion thereof. For example, CMOS TX chip 204 may comprise circuitry to translate signals that conform to a communication protocol used by the primary chip 202 to a suitable form to drive the micro-emitters of the micro-emitter array 206. For example, the translation may include a voltage conversion, a current conversion, and/or shaping of the signals (e.g., into suitable pulses).

In various embodiments, CMOS TX chip 204 may be manufactured using a different process node (generally designated by the process's minimum feature size) than the process node used to manufacture the micro-emitter array chip 206. For example, the CMOS TX chip 204 may be manufactured using a process node with small feature sizes than the process node used to manufacture the micro-emitter array chip 206. In some embodiments, micro-emitters may be grown on a wafer and then transferred to a CMOS TX chip (e.g., 204) comprising the driving circuitry (e.g., transconductance amplifiers) for the micro-emitters.

Figure 10:
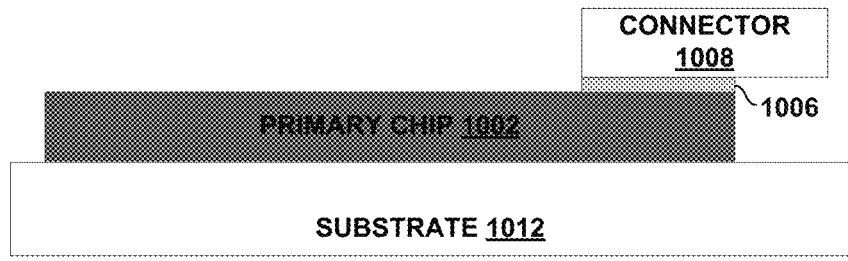
FIG. 10 depicts another packaging arrangement of a primary chip and a micro-emitter array, in accordance with any of the embodiments disclosed herein.

Micro-emitter array chip 206 may comprise a micro-emitter array (e.g., array 106). In the embodiment depicted, the micro-emitters may be on a dedicated chip (e.g., a chip comprising a silicon or sapphire substrate). In other embodiments, the micro-emitters may be manufactured on a first chip and then transferred onto another chip (e.g., the CMOS TX chip 204 or other chip). In the FIGS., a micro-emitter array on a dedicated chip will be shown as a thick block (e.g., as shown in FIG. 2), while a micro-emitter array that is transferred to another chip will be shown as a thin block (e.g., as shown in FIG. 10). However, the embodiments may, at least in some instances, be used interchangeably (e.g., a FIG. depicting a micro-emitter array chip may encompass embodiments in which a micro-emitter array has been transferred to a different chip and vice versa).

The micro-emitter array chip 206 and the CMOS TX chip 204 may be coupled together in any suitable manner. For example, wafer-to-wafer fusion may be applied to couple the micro-emitters of the micro-emitter array chip 206 onto underlying CMOS-based logic circuits of the CMOS TX chip 204. In some embodiments, the micro-emitter array chip 206 may include layered metal stacks as well as through-glass vias (TGVs) to provide the coupling.

Connector 208 may comprise any suitable interface for coupling the micro-emitter array 206 to an optical fiber (e.g., 108). A package receiving the optical signals may comprise a similar connector as well as a photodetector array, RX circuitry, and another primary chip to receive the communicated data. Although various FIGS. herein depict the connector as being on top of a micro-emitter array, in other embodiments, the connector could be on the bottom of the micro-emitter array or package substrate.

Figure 3:
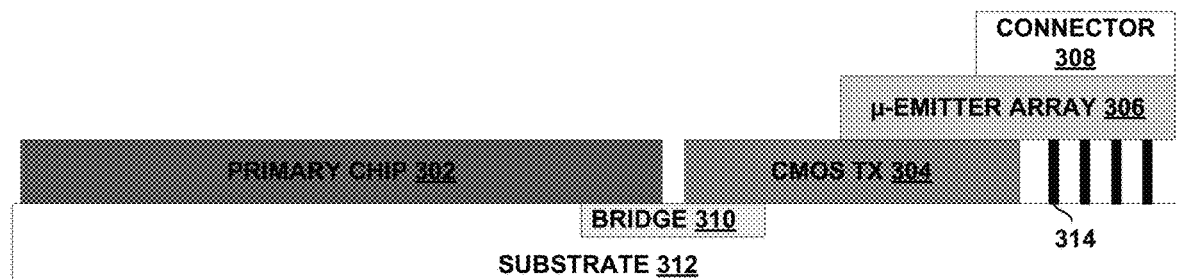
FIG. 3 depicts another packaging arrangement of a primary chip and a micro-emitter array, in accordance with any of the embodiments disclosed herein.

FIG. 3 depicts another packaging arrangement of a primary chip 302 and a micro-emitter array chip 306 supported by pillars 314, in accordance with any of the embodiments disclosed herein. Primary chip 302 is coupled to the CMOS TX chip 304 via a bridge 310 embedded in substrate 312. The micro-emitter array 306 is coupled to the CMOS TX chip 304 as well as a connector 308.

Given the very low power requirements and high signal density of the micro-emitter array 306, an "overhang" approach may be applied without requiring extensive pillars (e.g., Omni-Directional Interconnect (ODI)) for power and ground. In this embodiment, the micro-emitter array chip 306 is still coupled to the top of the CMOS TX chip 304, but a portion of the micro-emitter array chip 306 extends past the side of the CMOS TX chip 304. One or more pillars 314 are formed on the substrate 314 to contact the bottom of and to support the micro-emitter array chip 306. The pillars may be formed of any suitable material, such as silicon or other dielectric material.

Figure 4:
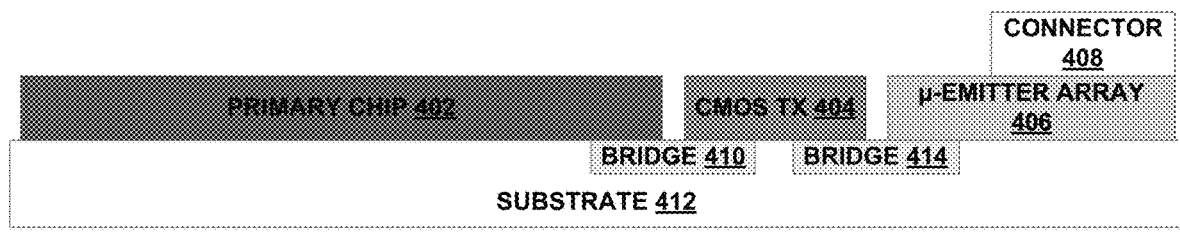
FIG. 4 depicts another packaging arrangement of a primary chip and a micro-emitter array, in accordance with any of the embodiments disclosed herein.

FIG. 4 depicts another packaging arrangement of a primary chip 402 and a micro-emitter array 406 and two discrete bridges 410 and 414, in accordance with any of the embodiments disclosed herein. Primary chip 402 is coupled to the CMOS TX chip 304 via a first bridge 410 embedded in substrate 412 and the CMOS TX chip 304 is coupled to the micro-emitter array 406 via a second bridge 414 embedded in the substrate 412. The micro-emitter array 406 is coupled to connector 408.

In some embodiments, the micro-emitters may be a natural match for fabric interfaces of the primary chip 402 (e.g., an on-die fabric interface of an SOC) such as meshes without any intervening serializers and deserializers (SERDES), in which the complexity of converting the signals from the protocol of the primary chip 402 to the form used by the micro-emitter array 406 may be quite low. In some embodiments, micro-emitter data transmission (e.g., uLED data transmission) may be capable of over 1 TB/s/mm$^2$, and the least amount of re-interpretation of on-die fabric protocols of the primary chip 402 and pins is ideal. In some embodiments, (e.g., where the mesh is exposed natively at the edge of the primary chip 402), it may be possible to do this translation with a very small unit of circuitry (thus CMOS TX chip 404 may have a relatively small size). In some embodiments, double-bridging in 2.5D integration may be used (e.g., to avoid structural problems when using minimal drivers on the CMOS TX chip, e.g., at less than 1 pJ/b of overhead). Thus, a first bridge 410 is used to couple pins of the primary chip 402 to pins of the CMOS TX chip 404 and a second bridge 414 is used to couple pins of the CMOS TX chip 404 to pins of the micro-emitter array chip 406.

Placement of the micro-emitter array 406 to the side of the CMOS TX chip 404 rather than on top of the CMOS TX chip 404 may allow the connector 408 to be placed on the bottom of substrate 412 in alternative embodiments, rather than on top of the micro-emitter array 406. Such embodiments may provide packaging advantages in some instances.

As mentioned above, the micro-emitter array 406 may be on its own dedicated chip on top of substrate 412 or could be transferred onto the substrate 412.

Figure 5:
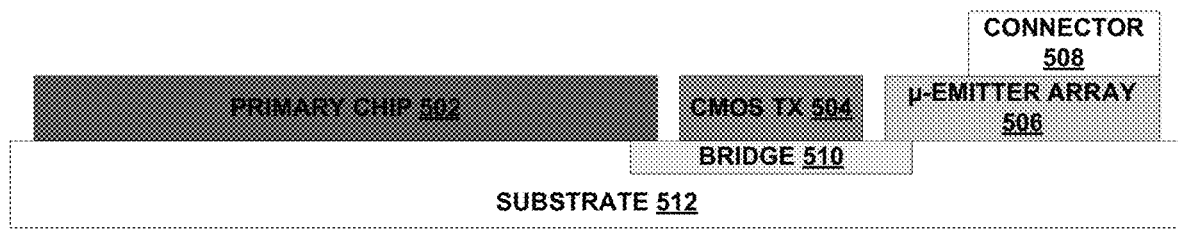
FIG. 5 depicts another packaging arrangement of a primary chip and a micro-emitter array, in accordance with any of the embodiments disclosed herein.

FIG. 5 depicts another packaging arrangement of a primary chip 502 and a micro-emitter array 506 with a bridge having two logical halves, in accordance with any of the embodiments disclosed herein. This embodiment is similar to the embodiment depicted in FIG. 4, except a larger bridge 510 is used to couple the primary chip 502 to the CMOS TX chip 504 and to couple the CMOS TX chip 504 to the micro-emitter array 506. In various embodiments, the bridge 510 may be logically split into two halves, with the first half coupling pins of the primary chip 502 to pins of the CMOS TX chip 504 and a second half coupling different pins of the CMOS TX chip 504 to pins of the micro-emitter array 506. Such embodiments may be practical if the translation between the signals of the primary chip 502 and the micro-emitter array 506 is small enough so as not to violate the design limits of the bridge 510. Micro-emitter array chip 506 is coupled to connector 508.

In the embodiment depicted, one side of the bridge 510 may extend under a side of the primary chip 502 and the other side of the bridge 510 may extend under a side of the micro-emitter array chip 506. In some embodiments, the logical half of the bridge 510 that couples the primary chip 502 to the CMOS TX chip 504 may be located within a first physical portion (e.g., half) of the bridge (e.g., the portion of the bridge nearest the primary chip 502) while the logical half of the bridge 510 that couples the CMOS TX chip 504 to the micro-emitter array chip 506 may be located on a second physical portion (e.g., half) of the bridge (e.g., the portion of the bridge nearest the micro-emitter array 506).

Figure 6:
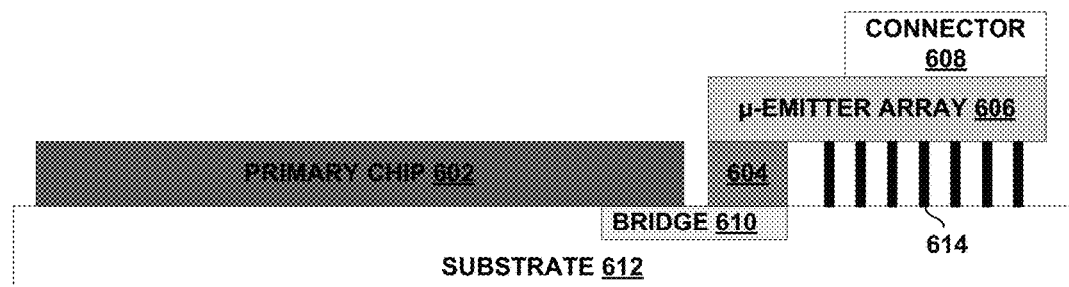
FIG. 6 depicts another packaging arrangement of a primary chip and a micro-emitter array, in accordance with any of the embodiments disclosed herein.

FIG. 6 depicts another packaging arrangement of a primary chip 602 and a micro-emitter array 606 with multiple pillars 614, in accordance with any of the embodiments disclosed herein. This embodiment utilizes concepts of the stacked embodiment shown in FIG. 2 as well as the overhang embodiment shown in FIG. 3. In this embodiment, the circuitry in the CMOS TX chip 604 is minimal. The primary chip 602 is coupled to the CMOS TX chip 604 via bridge 610. In the embodiment depicted, the width of the CMOS TX chip 604 is smaller than the width of the bridge 610. Thus, a smaller footprint package may be constructed.

In this embodiment, the micro-emitter array chip 606 is coupled to the top of the CMOS TX chip 604, but a large portion of the micro-emitter array chip 606 extends past the side of the CMOS TX chip 604. At least one pillar 614 is formed on the substrate 612 to contact the bottom of and to support the micro-emitter array chip 606. The pillars may be formed of any suitable material, such as silicon or other dielectric material. A connector 608 is coupled to the top of the micro-emitter array 606.

Figure 7:
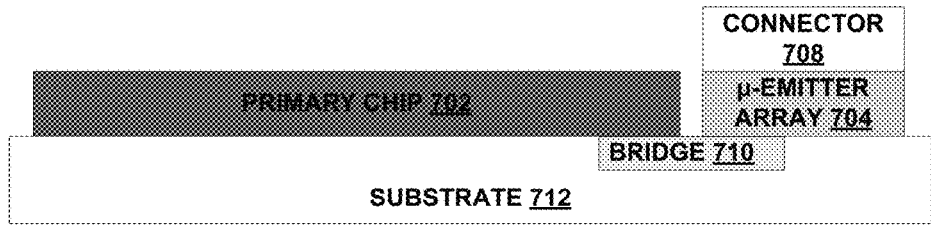
FIG. 7 depicts another packaging arrangement of a primary chip and a micro-emitter array, in accordance with any of the embodiments disclosed herein.

FIG. 7 depicts another packaging arrangement of a primary chip 702 and a micro-emitter array with an active bridge 710, in accordance with any of the embodiments disclosed herein. While one or more of the bridges depicted above may have been passive bridges (e.g., a passive bridge merely transport signals without using active circuitry to amplify the signals, convert the voltage or current of the signals, etc.), the bridge 710 may include a small amount of "active" circuitry to convert signals from the fabric of the primary chip 702 to the form used by the micro-emitter array 704.

In some embodiments, the physical properties of a micro-emitter 116 may be dominated by an extremely high energy efficiency (in one example, a micro-emitter may consume ~10 uA at 3.3V and use ~0.03 pJ/b for transmission at 3 dBm). Some primary chip interconnects, e.g., a multiple die fabric interconnect (e.g., MDFI) or Advanced Interface Bus (MB) interface may drive across a bridge 710 (e.g., EMIB) from a PHY layer using a low power and voltage (e.g., ~10 mA of power at a nominal 0.75V). Thus, a standard PHY driver of the primary chip 702 may have more than enough energy to be a transmitter driver for the micro-emitter array 704 as long as the bridge (e.g., 710) includes some active circuitry (e.g., a voltage converter or charge pump) to convert the signals to the form used to drive the micro-emitters. Such embodiments may further shrink the package floorplan and offer lower latency, lower power, and lower complexity design and integration at the component level. This is also likely to improve yield in various aspects of the assembly.

In a receiver implementation, the receive detector and gain circuits may be extremely low power devices. Accordingly, the primary chip may be coupled to a micro-photodetector array via a bridge with active circuitry comprising the detector and/or gain circuits.

Figure 8:
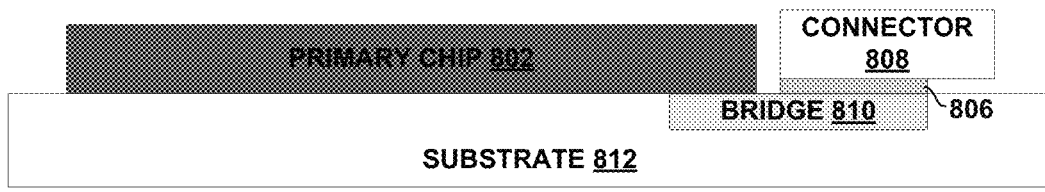
FIG. 8 depicts another packaging arrangement of a primary chip and a micro-emitter array, in accordance with any of the embodiments disclosed herein.

FIG. 8 depicts another packaging arrangement of a primary chip 802 and a micro-emitter array 806, in accordance with any of the embodiments disclosed herein. While at least some previous FIGS. illustrate a micro-emitter array on a dedicated chip comprising a substrate (e.g., glass substrate) for the micro-emitter arrays along with wafer or die fusion to a CMOS TX chip, as alluded to earlier (or transferring of the micro-emitter arrays to the CMOS TX chip), micro-transfer printing (or other suitable transfer techniques) of the micro-emitters may be utilized in various embodiments to place the micro-emitter array (e.g., 806) on a different chip (e.g., bridge 810 or a primary chip). In the embodiment of FIG. 8, the micro-emitters of micro-emitter array 806 may be transferred directly onto the underlying bridge 810 (which could be, e.g., a bridge with active components, similar to bridge 710). The connector 808 may then be coupled to (e.g., the top of) the micro-emitter array 806.

Such an embodiment may omit the glass substrate layer and wafer/die fusion to another chip. As mentioned earlier, this micro-transfer printing technique could also be applied to any of the prior discussed embodiments to replace a micro-emitter array placed on a dedicated substrate. Such embodiments may further increase yield and reduce costs.

Figure 9:
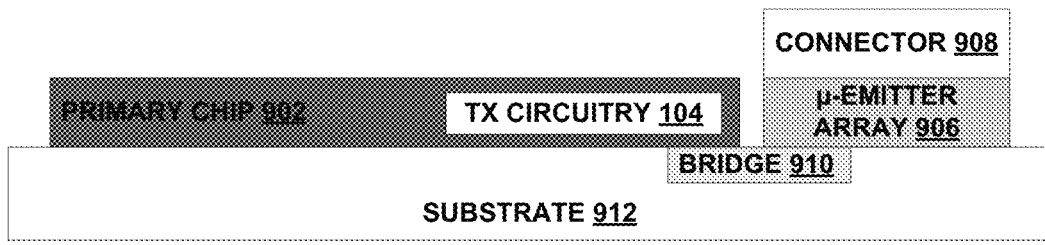
FIG. 9 depicts another packaging arrangement of a primary chip and a micro-emitter array, in accordance with any of the embodiments disclosed herein.

FIG. 9 depicts another packaging arrangement of a primary chip 902 and a micro-emitter array 906, in accordance with any of the embodiments disclosed herein. While some of the other embodiments described herein provide ways to use existing devices (e.g., primary chips that aren't specifically adapted for use with micro-emitters) with micro-emitter arrays, other embodiments may contemplate integration between primary chips and micro-emitter technology at the outset. As an example, for modularity and yield reasons, if 2.5D integration is ideal as a design constraint, the appropriate TX circuitry 104 (or other driving logic) may be included on the primary chip 902 itself. Unlike at least some current electrical and optical systems, such an embodiment may not require sophisticated mixed-signal logic support and large SERDES modules. Rather, simple TX circuits (such as any of the circuitry described above with respect to TX circuitry 104) operating at native mesh speeds can be directly implemented on the primary chip 902 to push the appropriate driver circuitry prior to the interface of the bridge 910. Since the primary chip 902 implements the appropriate driver circuitry, the micro-emitter array 906 can then be directly coupled to the bridge 910 itself. For example, the micro-emitter array 906 may be on its own chip and coupled to the bridge 1010 (which may be a passive EMIB bridge or other suitable bridge) as shown in FIG. 9, or the micro-emitter array 906 may be placed on the bridge 910 using micro-transfer printing (not shown) or other suitable transfer technique.

In various embodiments, the primary chip 902 could alternatively or additionally include RX circuitry 112 and may be similarly coupled to a micro-photodetector array (e.g., through a respective bridge).

FIG. 10 depicts another packaging arrangement of a primary chip 1002 and a micro-emitter array 1006, in accordance with any of the embodiments disclosed herein. In various embodiments, 3D integration may be used (with or without micro-transfer printing) to directly attach the micro-emitter array 1006 to the on-die fabric of the primary chip. The attachment may be made, e.g., directly on top of or inside each mesh stop, or the mesh wires could be extended to specific bond sites where the fusion and stacking of the micro-emitter array 1006 may be applied. Since the micro-emitter devices are very low power devices, various embodiments do not utilize further power delivery mechanisms (such as ODI or pillars) for the micro-emitter array 1006. In the embodiment depicted, connector 1008 is coupled to the top of the micro-emitter array 1006 and primary chip 1002 is coupled to package substrate 1012.

In various embodiments, an array of micro-photodetectors may also be included in the primary chip 1002 (in addition to the micro-emitter array 1006). As one example, the micro-photodetectors may be manufactured on a separate substrate and then transferred to the primary chip 1002. In another example, the array of micro-photodetectors may be manufactured on the primary chip 1002 using the same process used to manufacture the other circuitry of the primary chip 1002.

Figure 11:
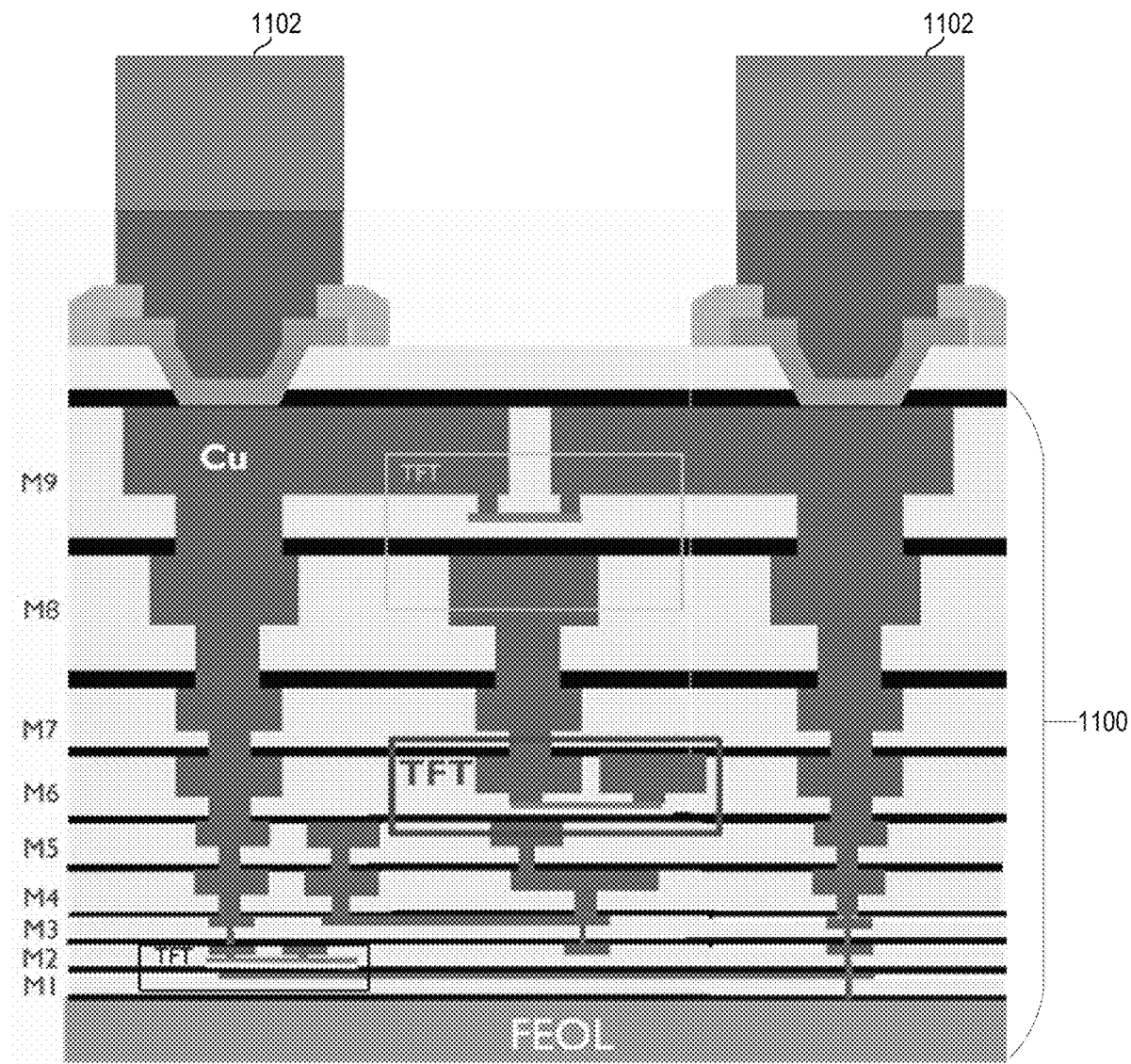
FIG. 11 depicts example integration of a chip with micro-emitters, in accordance with any of the embodiments disclosed herein.

FIG. 11 depicts example integration of a chip 1100 (e.g., a primary chip or bridge) with micro-emitters 1102, in accordance with any of the embodiments disclosed herein. The chip 1100 may include a plurality of metal layers (shown as M1-M9). Micro-emitters 1102 may be directly coupled to solder bumps at the top of the chip 1100. In the embodiment depicted, micro-emitters 1102 are placed directly on top of the solder bumps. Additionally or alternatively, a micro-emitter 1102 may be placed near a solder bump (but not on top of it) and coupled to the solder bump.

In the embodiment depicted, the chip also includes thin-film transistors (TFTs) that may be used, in some embodiments, to drive the micro-emitters 1102. In some embodiments, some of these transistors may be back end of line (BEOL) transistors that are formed during a BEOL process in which the metal layers are deposited on the chip 1100.

In one embodiment, the chip 1100 represents any of the primary chips described herein. In another embodiment, the chip 1100 represents an EMIB. In various embodiments, an EMIB may have a 35 um or 55 um bump pitch. Thus, if a micro-emitter (e.g., a micro-LED) is ~7 um×7 um in size, each EMIB bump may easily host one or more micro-emitters. In various embodiments the micro-emitters may be placed on top of the bump or may be placed on a substrate near the bump and may be coupled to the bump via a conductive connection.

The data that is provided by a primary chip to a set of EMIB bumps may be any suitable width (e.g., 32 bits wide, 1,024 bits wide, etc.). Each bump is an electrical output from the primary chip and may carry a single value when the signal is received from a digital platform or multiple values (e.g., perhaps as much as 8-16b worth of data) when the signal is received from an analog platform (e.g., FPGA, ADC, DAC, etc.). When a signal is driven over the EMIB, it may be passed from an upper-metal layer pitch (e.g., 10 um) to the EMIB bump density (e.g., 55 um, 35 um, etc.). In some embodiments, the EMIB bumps may have a hexagonal layout. Depending on the EMIB bump data rate and micro-emitter data rate, the micro-emitters may be much smaller than the EMIB bump. Thus, ample blank space may be left over (e.g., between the EMIB bumps). In some embodiments, the blank space may be utilized for adding additional micro-emitters for various reasons, such as redundancy and aging/defect handling, using multiple micro-emitters per bump in order the run the micro-emitters at a lower rate, etc. For example, multiple micro-emitters may be used to generate optical signals representing a higher speed electrical signal that cannot be represented by a single micro-emitter. In such embodiments, an encoding scheme with additional conversion logic may be utilized. For example, the logic may convert, e.g., a 16 Gbps NRZ electrical signal down for transmission by eight different micro-emitter transmitting at 2 Gbps each.

Figure 12:
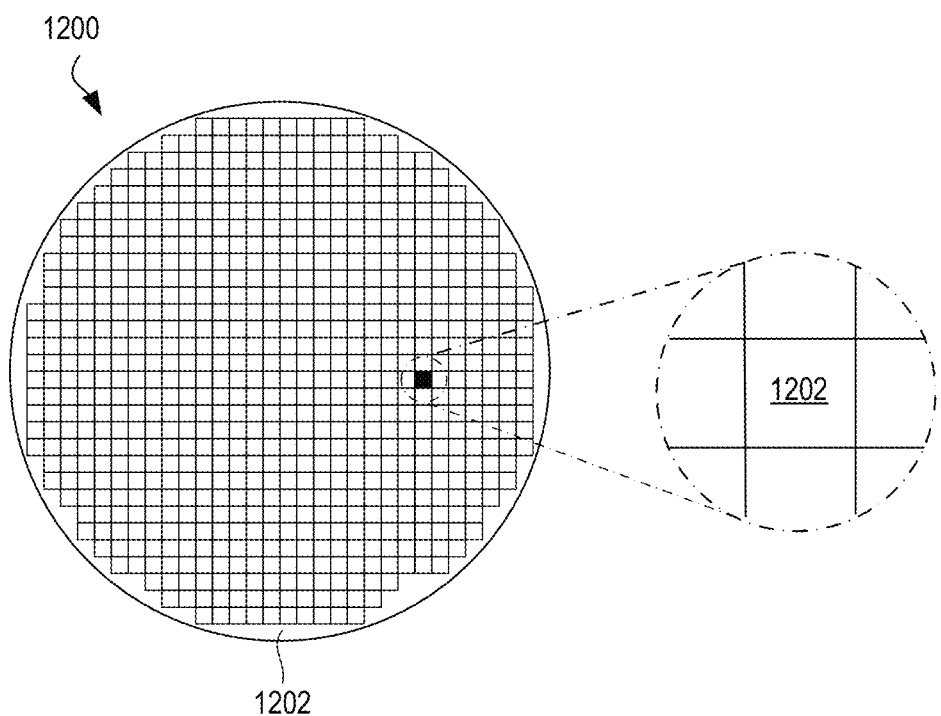
FIG. 12 depicts a top view of a wafer and dies that may be included in a microelectronic assembly, in accordance with any of the embodiments disclosed herein.

FIG. 12 is a top view of a wafer 1200 and dies 1202, where a die 1202 may be representative of an integrated circuit chip (e.g., a primary chip, CMOS TX chip, CMOS RX chip, micro-emitter array chip, micro-photodetector array chip, or other chip) disclosed herein. The wafer 1200 may be composed of semiconductor material and may include one or more dies 1202 having integrated circuit structures formed on a surface of the wafer 1200. The individual dies 1202 may be a repeating unit of an integrated circuit product that includes any suitable integrated circuit. After the fabrication of the semiconductor product is complete, the wafer 1200 may undergo a singulation process in which the dies 1202 are separated from one another to provide discrete "chips" of the integrated circuit product. The die 1202 may include one or more transistors (e.g., some of the transistors 1340 of FIG. 13, discussed below), supporting circuitry to route electrical signals to the transistors, passive components (e.g., signal traces, resistors, capacitors, or inductors), and/or any other integrated circuit components. In some embodiments, the wafer 1200 or the die 1202 may include a memory device (e.g., a random access memory (RAM) device, such as a static RAM (SRAM) device, a magnetic RAM (MRAM) device, a resistive RAM (RRAM) device, a conductive-bridging RAM (CBRAM) device, etc.), a logic device (e.g., an AND, OR, NAND, or NOR gate), or any other suitable circuit element. Multiple ones of these devices may be combined on a single die 1202. For example, a memory array formed by multiple memory devices may be formed on a same die 1202 as a processor unit (e.g., the processor unit 1502 of FIG. 15) or other logic that is configured to store information in the memory devices or execute instructions stored in the memory array. Various ones of the integrated circuit chips disclosed herein may be manufactured using a die-to-wafer assembly technique in which some dies (e.g., a die comprising one or more lasers or other regions to be protected from underfill) are attached to a wafer 1200 that include other dies, and the wafer 1200 is subsequently singulated.

Figure 13:
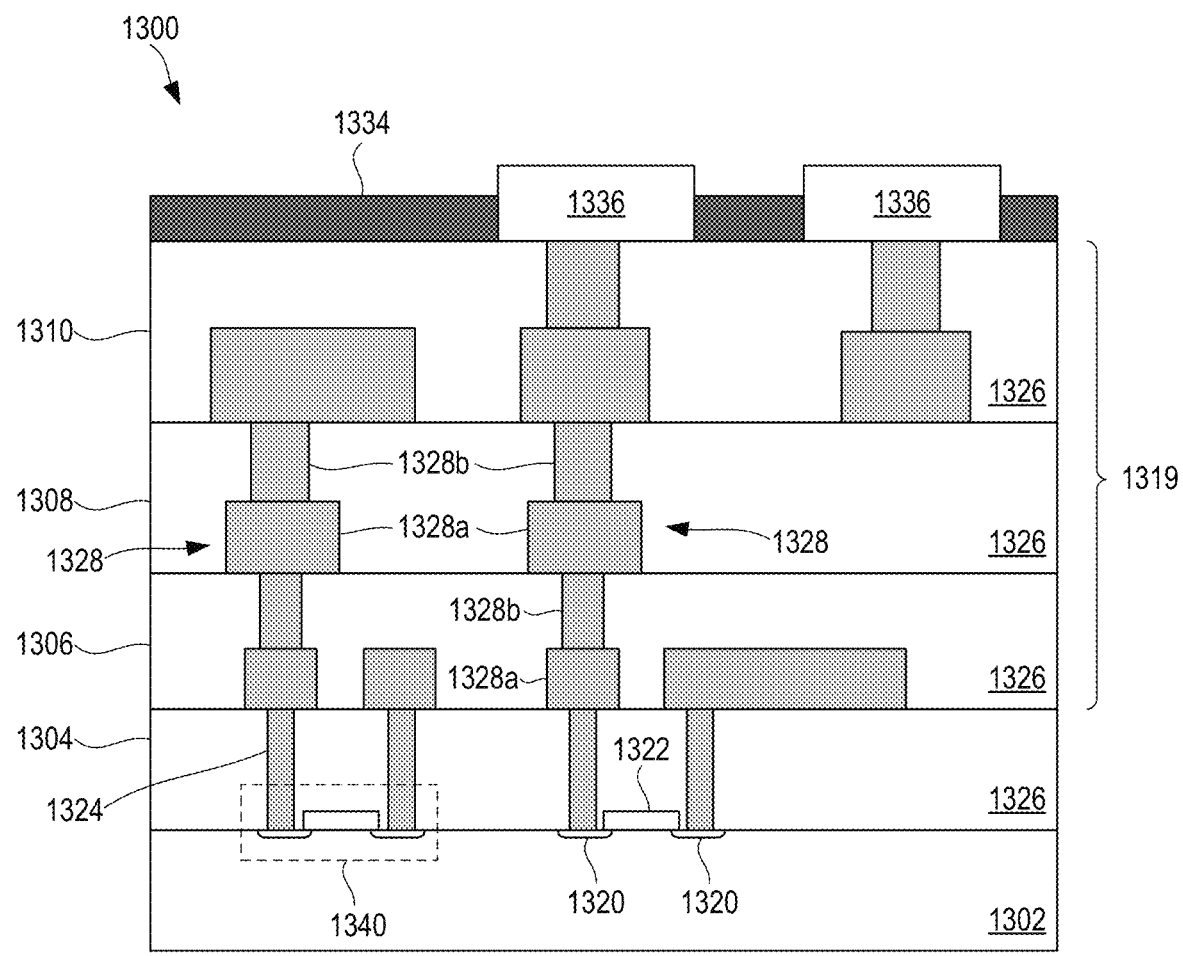
FIG. 13 depicts a cross-sectional side view of an integrated circuit device that may be included in a microelectronic assembly, in accordance with any of the embodiments disclosed herein.

FIG. 13 is a cross-sectional side view of an integrated circuit device 1300 that may be included in any of the integrated circuit chips disclosed herein. One or more of the integrated circuit devices 1300 may be included in one or more dies 1202 (FIG. 12). The integrated circuit device 1300 may be formed on a die substrate 1302 (e.g., the wafer 1200 of FIG. 12) and may be included in a die (e.g., the die 1202 of FIG. 12). The die substrate 1302 may be a semiconductor substrate composed of semiconductor material systems including, for example, n-type or p-type materials systems (or a combination of both). The die substrate 1302 may include, for example, a crystalline substrate formed using a bulk silicon or a silicon-on-insulator (SOI) substructure. In some embodiments, the die substrate 1302 may be formed using alternative materials, which may or may not be combined with silicon, that include, but are not limited to, germanium, indium antimonide, lead telluride, indium arsenide, indium phosphide, gallium arsenide, or gallium antimonide. Further materials classified as group II-VI, III-V, or IV may also be used to form the die substrate 1302. Although a few examples of materials from which the die substrate 1302 may be formed are described here, any material that may serve as a foundation for an integrated circuit device 1300 may be used. The die substrate 1302 may be part of a singulated die (e.g., the dies 1202 of FIG. 12) or a wafer (e.g., the wafer 1200 of FIG. 12).

The integrated circuit device 1300 may include one or more device layers 1304 disposed on the die substrate 1302. The device layer 1304 may include features of one or more transistors 1340 (e.g., metal oxide semiconductor field-effect transistors (MOSFETs)) formed on the die substrate 1302. The transistors 1340 may include, for example, one or more source and/or drain (S/D) regions 1320, a gate 1322 to control current flow between the S/D regions 1320, and one or more S/D contacts 1324 to route electrical signals to/from the S/D regions 1320. The transistors 1340 may include additional features not depicted for the sake of clarity, such as device isolation regions, gate contacts, and the like. The transistors 1340 are not limited to the type and configuration depicted in FIG. 13 and may include a wide variety of other types and configurations such as, for example, planar transistors, non-planar transistors, or a combination of both. Non-planar transistors may include FinFET transistors, such as double-gate transistors or tri-gate transistors, and wraparound or all-around gate transistors, such as nanoribbon, nanosheet, or nanowire transistors.

A transistor 1340 may include a gate 1322 formed of at least two layers, a gate dielectric and a gate electrode. The gate dielectric may include one layer or a stack of layers. The one or more layers may include silicon oxide, silicon dioxide, silicon carbide, and/or a high-k dielectric material.

The high-k dielectric material may include elements such as hafnium, silicon, oxygen, titanium, tantalum, lanthanum, aluminum, zirconium, barium, strontium, yttrium, lead, scandium, niobium, and zinc. Examples of high-k materials that may be used in the gate dielectric include, but are not limited to, hafnium oxide, hafnium silicon oxide, lanthanum oxide, lanthanum aluminum oxide, zirconium oxide, zirconium silicon oxide, tantalum oxide, titanium oxide, barium strontium titanium oxide, barium titanium oxide, strontium titanium oxide, yttrium oxide, aluminum oxide, lead scandium tantalum oxide, and lead zinc niobate. In some embodiments, an annealing process may be carried out on the gate dielectric to improve its quality when a high-k material is used.

The gate electrode may be formed on the gate dielectric and may include at least one p-type work function metal or n-type work function metal, depending on whether the transistor 1340 is to be a p-type metal oxide semiconductor (PMOS) or an n-type metal oxide semiconductor (NMOS) transistor. In some implementations, the gate electrode may consist of a stack of two or more metal layers, where one or more metal layers are work function metal layers and at least one metal layer is a fill metal layer. Further metal layers may be included for other purposes, such as a barrier layer.

For a PMOS transistor, metals that may be used for the gate electrode include, but are not limited to, ruthenium, palladium, platinum, cobalt, nickel, conductive metal oxides (e.g., ruthenium oxide), and any of the metals discussed below with reference to an NMOS transistor (e.g., for work function tuning). For an NMOS transistor, metals that may be used for the gate electrode include, but are not limited to, hafnium, zirconium, titanium, tantalum, aluminum, alloys of these metals, carbides of these metals (e.g., hafnium carbide, zirconium carbide, titanium carbide, tantalum carbide, and aluminum carbide), and any of the metals discussed above with reference to a PMOS transistor (e.g., for work function tuning).

In some embodiments, when viewed as a cross-section of the transistor 1340 along the source-channel-drain direction, the gate electrode may consist of a U-shaped structure that includes a bottom portion substantially parallel to the surface of the die substrate 1302 and two sidewall portions that are substantially perpendicular to the top surface of the die substrate 1302. In other embodiments, at least one of the metal layers that form the gate electrode may simply be a planar layer that is substantially parallel to the top surface of the die substrate 1302 and does not include sidewall portions substantially perpendicular to the top surface of the die substrate 1302. In other embodiments, the gate electrode may consist of a combination of U-shaped structures and planar, non-U-shaped structures. For example, the gate electrode may consist of one or more U-shaped metal layers formed atop one or more planar, non-U-shaped layers.

In some embodiments, a pair of sidewall spacers may be formed on opposing sides of the gate stack to bracket the gate stack. The sidewall spacers may be formed from materials such as silicon nitride, silicon oxide, silicon carbide, silicon nitride doped with carbon, and silicon oxynitride. Processes for forming sidewall spacers are well known in the art and generally include deposition and etching process steps. In some embodiments, a plurality of spacer pairs may be used; for instance, two pairs, three pairs, or four pairs of sidewall spacers may be formed on opposing sides of the gate stack.

The S/D regions 1320 may be formed within the die substrate 1302 adjacent to the gate 1322 of individual transistors 1340. The S/D regions 1320 may be formed using an implantation/diffusion process or an etching/deposition process, for example. In the former process, dopants such as boron, aluminum, antimony, phosphorous, or arsenic may be ion-implanted into the die substrate 1302 to form the S/D regions 1320. An annealing process that activates the dopants and causes them to diffuse farther into the die substrate 1302 may follow the ion-implantation process. In the latter process, the die substrate 1302 may first be etched to form recesses at the locations of the S/D regions 1320. An epitaxial deposition process may then be carried out to fill the recesses with material that is used to fabricate the S/D regions 1320. In some implementations, the S/D regions 1320 may be fabricated using a silicon alloy such as silicon germanium or silicon carbide. In some embodiments, the epitaxially deposited silicon alloy may be doped in situ with dopants such as boron, arsenic, or phosphorous. In some embodiments, the S/D regions 1320 may be formed using one or more alternate semiconductor materials such as germanium or a group III-V material or alloy. In further embodiments, one or more layers of metal and/or metal alloys may be used to form the S/D regions 1320.

Electrical signals, such as power and/or input/output (I/O) signals, may be routed to and/or from the devices (e.g., transistors 1340) of the device layer 1304 through one or more interconnect layers disposed on the device layer 1304 (illustrated in FIG. 13 as interconnect layers 1306-1310). For example, electrically conductive features of the device layer 1304 (e.g., the gate 1322 and the S/D contacts 1324) may be electrically coupled with the interconnect structures 1328 of the interconnect layers 1306-1310. The one or more interconnect layers 1306-1310 may form a metallization stack (also referred to as an "ILD stack") 1319 of the integrated circuit device 1300.

The interconnect structures 1328 may be arranged within the interconnect layers 1306-1310 to route electrical signals according to a wide variety of designs; in particular, the arrangement is not limited to the particular configuration of interconnect structures 1328 depicted in FIG. 13. Although a particular number of interconnect layers 1306-1310 is depicted in FIG. 13, embodiments of the present disclosure include integrated circuit devices having more or fewer interconnect layers than depicted.

In some embodiments, the interconnect structures 1328 may include lines 1328a and/or vias 1328b filled with an electrically conductive material such as a metal. The lines 1328a may be arranged to route electrical signals in a direction of a plane that is substantially parallel with a surface of the die substrate 1302 upon which the device layer 1304 is formed. For example, the lines 1328a may route electrical signals in a direction in and out of the page and/or in a direction across the page from the perspective of FIG. 11. The vias 1328b may be arranged to route electrical signals in a direction of a plane that is substantially perpendicular to the surface of the die substrate 1302 upon which the device layer 1304 is formed. In some embodiments, the vias 1328b may electrically couple lines 1328a of different interconnect layers 1306-1310 together.

The interconnect layers 1306-1310 may include a dielectric material 1326 disposed between the interconnect structures 1328, as shown in FIG. 13. In some embodiments, dielectric material 1326 disposed between the interconnect structures 1328 in different ones of the interconnect layers 1306-1310 may have different compositions; in other embodiments, the composition of the dielectric material 1326 between different interconnect layers 1306-1310 may be the same. The device layer 1304 may include a dielectric material 1326 disposed between the transistors 1340 and a bottom layer of the metallization stack as well. The dielectric material 1326 included in the device layer 1304 may have a different composition than the dielectric material 1326 included in the interconnect layers 1306-1310; in other embodiments, the composition of the dielectric material 1326 in the device layer 1304 may be the same as a dielectric material 1326 included in any one of the interconnect layers 1306-1310.

A first interconnect layer 1306 (referred to as Metal 1 or "M1") may be formed directly on the device layer 1304. In some embodiments, the first interconnect layer 1306 may include lines 1328a and/or vias 1328b, as shown. The lines 1328a of the first interconnect layer 1306 may be coupled with contacts (e.g., the S/D contacts 1324) of the device layer 1304. The vias 1328b of the first interconnect layer 1306 may be coupled with the lines 1328a of a second interconnect layer 1308.

The second interconnect layer 1308 (referred to as Metal 2 or "M2") may be formed directly on the first interconnect layer 1306. In some embodiments, the second interconnect layer 1308 may include via 1328b to couple the lines 1328a of the second interconnect layer 1308 with the lines 1328a of a third interconnect layer 1310. Although the lines 1328a and the vias 1328b are structurally delineated with a line within individual interconnect layers for the sake of clarity, the lines 1328a and the vias 1328b may be structurally and/or materially contiguous (e.g., simultaneously filled during a dual-damascene process) in some embodiments.

The third interconnect layer 1310 (referred to as Metal 3 or "M3") (and additional interconnect layers, as desired) may be formed in succession on the second interconnect layer 1308 according to similar techniques and configurations described in connection with the second interconnect layer 1308 or the first interconnect layer 1306. In some embodiments, the interconnect layers that are "higher up" in the metallization stack 1319 in the integrated circuit device 1300 (i.e., farther away from the device layer 1304) may be thicker that the interconnect layers that are lower in the metallization stack 1319, with lines 1328a and vias 1328b in the higher interconnect layers being thicker than those in the lower interconnect layers.

The integrated circuit device 1300 may include a solder resist material 1334 (e.g., polyimide or similar material) and one or more conductive contacts 1336 formed on the interconnect layers 1306-1310. In FIG. 13, the conductive contacts 1336 are illustrated as taking the form of bond pads. The conductive contacts 1336 may be electrically coupled with the interconnect structures 1328 and configured to route the electrical signals of the transistor(s) 1340 to external devices (e.g., substrate 202). For example, solder bonds may be formed on the one or more conductive contacts 1336 to mechanically and/or electrically couple an integrated circuit die including the integrated circuit device 1300 with another component (e.g., a printed circuit board). In one embodiment, conductive contacts 1236 may couple to conductive contacts of substrate 202 via solder joints 208. The integrated circuit device 1300 may include additional or alternate structures to route the electrical signals from the interconnect layers 1306-1310; for example, the conductive contacts 1336 may include other analogous features (e.g., posts) that route the electrical signals to external components.

In some embodiments in which the integrated circuit device 1300 is a double-sided die, the integrated circuit device 1300 may include another metallization stack (not shown) on the opposite side of the device layer(s) 1304. This metallization stack may include multiple interconnect layers as discussed above with reference to the interconnect layers 1306-1310, to provide conductive pathways (e.g., including conductive lines and vias) between the device layer(s) 1304 and additional conductive contacts (not shown) on the opposite side of the integrated circuit device 1300 from the conductive contacts 1336.

In other embodiments in which the integrated circuit device 1300 is a double-sided die, the integrated circuit device 1300 may include one or more through silicon vias (TSVs) through the die substrate 1302; these TSVs may make contact with the device layer(s) 1304, and may provide conductive pathways between the device layer(s) 1304 and additional conductive contacts (not shown) on the opposite side of the integrated circuit device 1300 from the conductive contacts 1336. In some embodiments, TSVs extending through the substrate can be used for routing power and ground signals from conductive contacts on the opposite side of the integrated circuit device 1300 from the conductive contacts 1336 to the transistors 1340 and any other components integrated into the circuit device 1300, and the metallization stack 1319 can be used to route I/O signals from the conductive contacts 1336 to transistors 1340 and any other components integrated into the circuit device 1300.

Multiple integrated circuit devices 1300 may be stacked with one or more TSVs in the individual stacked devices providing connection between one of the devices to any of the other devices in the stack. For example, one or more high-bandwidth memory (HBM) integrated circuit dies can be stacked on top of a base integrated circuit die and TSVs in the HBM dies can provide connection between the individual HBM and the base integrated circuit die. Conductive contacts can provide additional connections between adjacent integrated circuit dies in the stack. In some embodiments, the conductive contacts can be fine-pitch solder joints (microbumps).

Figure 14:
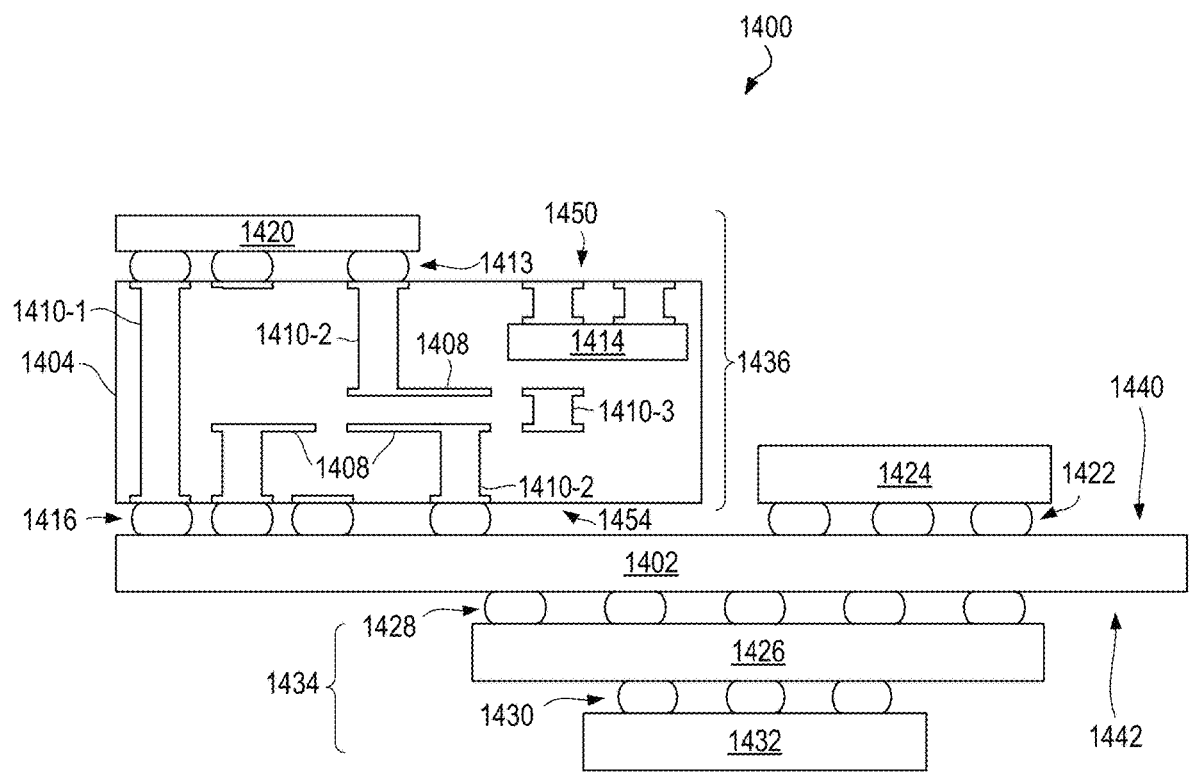
FIG. 14 depicts a cross-sectional side view of an integrated circuit device assembly that may include a microelectronic assembly, in accordance with any of the embodiments disclosed herein.

FIG. 14 is a cross-sectional side view of an integrated circuit device assembly 1400 that may include any of the integrated circuit chips disclosed herein. The integrated circuit device assembly 1400 includes a number of components disposed on a circuit board 1402 (which may be a motherboard, system board, mainboard, etc.). The integrated circuit device assembly 1400 includes components disposed on a first face 1440 of the circuit board 1402 and an opposing second face 1442 of the circuit board 1402; generally, components may be disposed on one or both faces 1440 and 1442.

In some embodiments, the circuit board 1402 may be a printed circuit board (PCB) including multiple metal (or interconnect) layers separated from one another by layers of dielectric material and interconnected by electrically conductive vias. In one embodiment, substrate 202 may comprise circuit board 1302. The individual metal layers comprise conductive traces. Any one or more of the metal layers may be formed in a desired circuit pattern to route electrical signals (optionally in conjunction with other metal layers) between the components coupled to the circuit board 1402. In other embodiments, the circuit board 1402 may be a non-PCB substrate. The integrated circuit device assembly

1400 illustrated in FIG. 14 includes a package-on-interposer structure 1436 coupled to the first face 1440 of the circuit board 1402 by coupling components 1416. The coupling components 1416 may electrically and mechanically couple the package-on-interposer structure 1436 to the circuit board 1402, and may include solder balls (as shown in FIG. 14), pins (e.g., as part of a pin grid array (PGA), contacts (e.g., as part of a land grid array (LGA)), male and female portions of a socket, an adhesive, an underfill material, and/or any other suitable electrical and/or mechanical coupling structure. The coupling components 1416 may serve as the coupling components illustrated or described for any of the substrate assembly or substrate assembly components described herein, as appropriate.

The package-on-interposer structure 1436 may include an integrated circuit component 1420 coupled to an interposer 1404 by coupling components 1418. The coupling components 1418 may take any suitable form for the application, such as the forms discussed above with reference to the coupling components 1416. Although a single integrated circuit component 1420 is shown in FIG. 14, multiple integrated circuit components may be coupled to the interposer 1404; indeed, additional interposers may be coupled to the interposer 1404. The interposer 1404 may provide an intervening substrate used to bridge the circuit board 1402 and the integrated circuit component 1420.

The integrated circuit component 1420 may be a packaged or unpackaged integrated circuit product that includes one or more integrated circuit dies (e.g., the die 1202 of FIG. 12, the integrated circuit device 1300 of FIG. 13) and/or one or more other suitable components. A packaged integrated circuit component comprises one or more integrated circuit dies mounted on a package substrate with the integrated circuit dies and package substrate encapsulated in a casing material, such as a metal, plastic, glass, or ceramic. In one example of an unpackaged integrated circuit component 1420, a single monolithic integrated circuit die comprises solder joints attached to contacts on the die. The solder joints allow the die to be directly attached to the interposer 1404. The integrated circuit component 1420 can comprise one or more computing system components, such as one or more processor units (e.g., system-on-a-chip (SoC), processor core, graphics processor unit (GPU), accelerator, chipset processor), I/O controller, memory, or network interface controller. In some embodiments, the integrated circuit component 1420 can comprise one or more additional active or passive devices such as capacitors, decoupling capacitors, resistors, inductors, fuses, diodes, transformers, sensors, electrostatic discharge (ESD) devices, and memory devices.

In embodiments where the integrated circuit component 1420 comprises multiple integrated circuit dies, the dies can be of the same type (a homogeneous multi-die integrated circuit component) or of two or more different types (a heterogeneous multi-die integrated circuit component). A multi-die integrated circuit component can be referred to as a multi-chip package (MCP) or multi-chip module (MCM).

In addition to comprising one or more processor units, the integrated circuit component 1420 can comprise additional components, such as embedded DRAM, stacked high bandwidth memory (HBM), shared cache memories, input/output (I/O) controllers, or memory controllers. Any of these additional components can be located on the same integrated circuit die as a processor unit, or on one or more integrated circuit dies separate from the integrated circuit dies comprising the processor units. These separate integrated circuit dies can be referred to as "chiplets". In embodiments where an integrated circuit component comprises multiple integrated circuit dies, interconnections between dies can be provided by the package substrate, one or more silicon interposers, one or more silicon bridges embedded in the package substrate (such as Intel® embedded multi-die interconnect bridges (EMIBs)), or combinations thereof.

Generally, the interposer 1404 may spread connections to a wider pitch or reroute a connection to a different connection. For example, the interposer 1404 may couple the integrated circuit component 1420 to a set of ball grid array (BGA) conductive contacts of the coupling components 1416 for coupling to the circuit board 1402. In the embodiment illustrated in FIG. 14, the integrated circuit component 1420 and the circuit board 1402 are attached to opposing sides of the interposer 1404; in other embodiments, the integrated circuit component 1420 and the circuit board 1402 may be attached to a same side of the interposer 1404. In some embodiments, three or more components may be interconnected by way of the interposer 1404.

In some embodiments, the interposer 1404 may be formed as a PCB, including multiple metal layers separated from one another by layers of dielectric material and interconnected by electrically conductive vias. In some embodiments, the interposer 1404 may be formed of an epoxy resin, a fiberglass-reinforced epoxy resin, an epoxy resin with inorganic fillers, a ceramic material, or a polymer material such as polyimide. In some embodiments, the interposer 1404 may be formed of alternate rigid or flexible materials that may include the same materials described above for use in a semiconductor substrate, such as silicon, germanium, and other group III-V and group IV materials. The interposer 1404 may include metal interconnects 1408 and vias 1410, including but not limited to through hole vias 1410-1 (that extend from a first face 1450 of the interposer 1404 to a second face 1454 of the interposer 1404), blind vias 1410-2 (that extend from the first or second faces 1450 or 1454 of the interposer 1404 to an internal metal layer), and buried vias 1410-3 (that connect internal metal layers).

In some embodiments, the interposer 1404 can comprise a silicon interposer. Through silicon vias (TSV) extending through the silicon interposer can connect connections on a first face of a silicon interposer to an opposing second face of the silicon interposer. In some embodiments, an interposer 1404 comprising a silicon interposer can further comprise one or more routing layers to route connections on a first face of the interposer 1404 to an opposing second face of the interposer 1404.

The interposer 1404 may further include embedded devices 1414, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as radio frequency devices, power amplifiers, power management devices, antennas, arrays, sensors, and microelectromechanical systems (MEMS) devices may also be formed on the interposer 1404. The package-on-interposer structure 1436 may take the form of any of the package-on-interposer structures known in the art. In embodiments where the interposer is a non-printed circuit board The integrated circuit device assembly 1400 may include an integrated circuit component 1424 coupled to the first face 1440 of the circuit board 1402 by coupling components 1422. The coupling components 1422 may take the form of any of the embodiments discussed above with reference to the coupling components 1416, and the integrated circuit component 1424 may take the form of any of the embodiments discussed above with reference to the integrated circuit component 1420.

The integrated circuit device assembly 1400 illustrated in FIG. 14 includes a package-on-package structure 1434 coupled to the second face 1442 of the circuit board 1402 by coupling components 1428. The package-on-package structure 1434 may include an integrated circuit component 1426 and an integrated circuit component 1432 coupled together by coupling components 1430 such that the integrated circuit component 1426 is disposed between the circuit board 1402 and the integrated circuit component 1432. The coupling components 1428 and 1430 may take the form of any of the embodiments of the coupling components 1416 discussed above, and the integrated circuit components 1426 and 1432 may take the form of any of the embodiments of the integrated circuit component 1420 discussed above. The package-on-package structure 1434 may be configured in accordance with any of the package-on-package structures known in the art.

Figure 15:
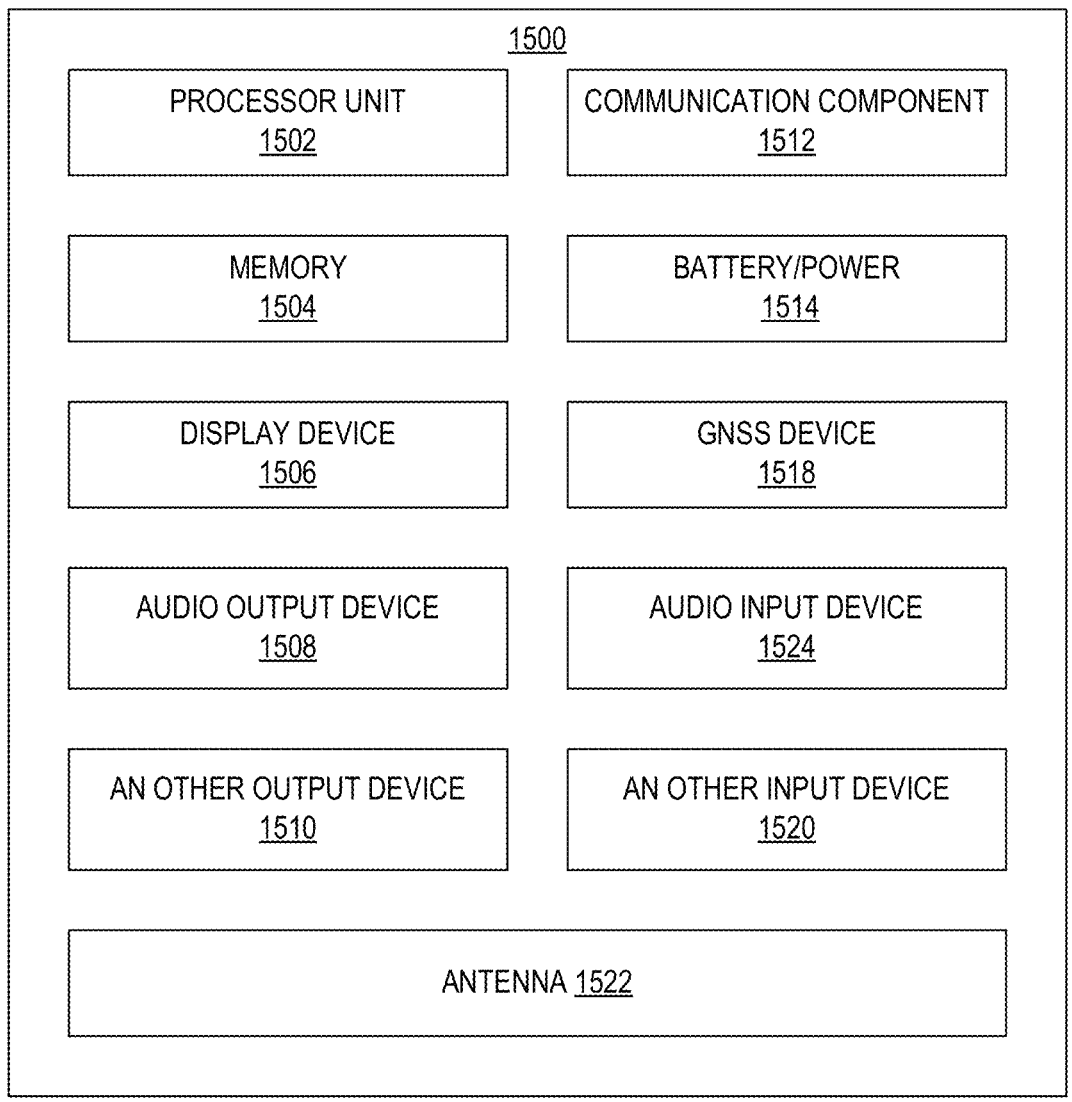
FIG. 15 depicts a block diagram of an example electrical device that may include a microelectronic assembly, in accordance with any of the embodiments disclosed herein.

FIG. 15 is a block diagram of an example electrical device 1500 that may include one or more of the IC chips and substrates disclosed herein. For example, any suitable ones of the components of the electrical device 1500 may include one or more of the integrated circuit device assemblies 1400, integrated circuit components 1420, integrated circuit devices 1300, or integrated circuit dies 1202 disclosed herein. A number of components are illustrated in FIG. 15 as included in the electrical device 1500, but any one or more of these components may be omitted or duplicated, as suitable for the application. In some embodiments, some or all of the components included in the electrical device 1500 may be attached to one or more motherboards mainboards, or system boards. In some embodiments, one or more of these components are fabricated onto a single system-on-a-chip (SoC) die.

Additionally, in various embodiments, the electrical device 1500 may not include one or more of the components illustrated in FIG. 15, but the electrical device 1500 may include interface circuitry for coupling to the one or more components. For example, the electrical device 1500 may not include a display device 1506, but may include display device interface circuitry (e.g., a connector and driver circuitry) to which a display device 1506 may be coupled. In another set of examples, the electrical device 1500 may not include an audio input device 1524 or an audio output device 1508, but may include audio input or output device interface circuitry (e.g., connectors and supporting circuitry) to which an audio input device 1524 or audio output device 1508 may be coupled.

The electrical device 1500 may include one or more processor units 1502 (e.g., one or more processor units). As used herein, the terms "processor unit", "processing unit" or "processor" may refer to any device or portion of a device that processes electronic data from registers and/or memory to transform that electronic data into other electronic data that may be stored in registers and/or memory. The processor unit 1502 may include one or more digital signal processors (DSPs), application-specific integrated circuits (ASICs), central processing units (CPUs), graphics processing units (GPUs), general-purpose GPUs (GPGPUs), accelerated processing units (APUs), field-programmable gate arrays (FPGAs), neural network processing units (NPUs), data processor units (DPUs), accelerators (e.g., graphics accelerator, compression accelerator, artificial intelligence accelerator), controller cryptoprocessors (specialized processors that execute cryptographic algorithms within hardware), server processors, controllers, or any other suitable type of processor units. As such, the processor unit can be referred to as an XPU (or xPU).

The electrical device 1500 may include a memory 1504, which may itself include one or more memory devices such as volatile memory (e.g., dynamic random access memory (DRAM), static random-access memory (SRAM)), non-volatile memory (e.g., read-only memory (ROM), flash memory, chalcogenide-based phase-change non-voltage memories), solid state memory, and/or a hard drive. In some embodiments, the memory 1504 may include memory that is located on the same integrated circuit die as the processor unit 1502. This memory may be used as cache memory (e.g., Level 1 (L1), Level 2 (L2), Level 3 (L3), Level 4 (L4), Last Level Cache (LLC)) and may include embedded dynamic random access memory (eDRAM) or spin transfer torque magnetic random access memory (STT-MRAM).

In some embodiments, the electrical device 1500 can comprise one or more processor units 1502 that are heterogeneous or asymmetric to another processor unit 1502 in the electrical device 1500. There can be a variety of differences between the processing units 1502 in a system in terms of a spectrum of metrics of merit including architectural, microarchitectural, thermal, power consumption characteristics, and the like. These differences can effectively manifest themselves as asymmetry and heterogeneity among the processor units 1502 in the electrical device 1500.

In some embodiments, the electrical device 1500 may include a communication component 1512 (e.g., one or more communication components). For example, the communication component 1512 can manage wireless communications for the transfer of data to and from the electrical device 1500. The term "wireless" and its derivatives may be used to describe circuits, devices, systems, methods, techniques, communications channels, etc., that may communicate data through the use of modulated electromagnetic radiation through a nonsolid medium. The term "wireless" does not imply that the associated devices do not contain any wires, although in some embodiments they might not.

The communication component 1512 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication component 1512 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication component 1512 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication component 1512 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication component 1512 may operate in accordance with other wireless protocols in other embodiments. The electrical device 1500 may include an antenna 1522 to facilitate wireless communications and/or to receive other wireless communications (such as AM or FM radio transmissions).

In some embodiments, the communication component 1512 may manage wired communications, such as electrical, optical, or any other suitable communication protocols (e.g., IEEE 802.3 Ethernet standards). As noted above, the communication component 1512 may include multiple communication components. For instance, a first communication component 1512 may be dedicated to shorter-range wireless communications such as Wi-Fi or Bluetooth, and a second communication component 1512 may be dedicated to longer-range wireless communications such as global positioning system (GPS), EDGE, GPRS, CDMA, WiMAX, LTE, EV-DO, or others. In some embodiments, a first communication component 1512 may be dedicated to wireless communications, and a second communication component 1512 may be dedicated to wired communications.

The electrical device 1500 may include battery/power circuitry 1514. The battery/power circuitry 1514 may include one or more energy storage devices (e.g., batteries or capacitors) and/or circuitry for coupling components of the electrical device 1500 to an energy source separate from the electrical device 1500 (e.g., AC line power).

The electrical device 1500 may include a display device 1506 (or corresponding interface circuitry, as discussed above). The display device 1506 may include one or more embedded or wired or wirelessly connected external visual indicators, such as a heads-up display, a computer monitor, a projector, a touchscreen display, a liquid crystal display (LCD), a light-emitting diode display, or a flat panel display.

The electrical device 1500 may include an audio output device 1508 (or corresponding interface circuitry, as discussed above). The audio output device 1508 may include any embedded or wired or wirelessly connected external device that generates an audible indicator, such speakers, headsets, or earbuds.

The electrical device 1500 may include an audio input device 1524 (or corresponding interface circuitry, as discussed above). The audio input device 1524 may include any embedded or wired or wirelessly connected device that generates a signal representative of a sound, such as microphones, microphone arrays, or digital instruments (e.g., instruments having a musical instrument digital interface (MIDI) output). The electrical device 1500 may include a Global Navigation Satellite System (GNSS) device 1518 (or corresponding interface circuitry, as discussed above), such as a Global Positioning System (GPS) device. The GNSS device 1518 may be in communication with a satellite-based system and may determine a geolocation of the electrical device 1500 based on information received from one or more GNSS satellites, as known in the art.

The electrical device 1500 may include an other output device 1510 (or corresponding interface circuitry, as discussed above). Examples of the other output device 1510 may include an audio codec, a video codec, a printer, a wired or wireless transmitter for providing information to other devices, or an additional storage device.

The electrical device 1500 may include an other input device 1520 (or corresponding interface circuitry, as discussed above). Examples of the other input device 1520 may include an accelerometer, a gyroscope, a compass, an image capture device (e.g., monoscopic or stereoscopic camera), a trackball, a trackpad, a touchpad, a keyboard, a cursor control device such as a mouse, a stylus, a touchscreen, proximity sensor, microphone, a bar code reader, a Quick Response (QR) code reader, electrocardiogram (ECG) sensor, PPG (photoplethysmogram) sensor, galvanic skin response sensor, any other sensor, or a radio frequency identification (RFID) reader.

The electrical device 1500 may have any desired form factor, such as a hand-held or mobile electrical device (e.g., a cell phone, a smart phone, a mobile internet device, a music player, a tablet computer, a laptop computer, a 2-in-1 convertible computer, a portable all-in-one computer, a netbook computer, an ultrabook computer, a personal digital assistant (PDA), an ultra mobile personal computer, a portable gaming console, etc.), a desktop electrical device, a server, a rack-level computing solution (e.g., blade, tray or sled computing systems), a workstation or other networked computing component, a printer, a scanner, a monitor, a set-top box, an entertainment control unit, a stationary gaming console, smart television, a vehicle control unit, a digital camera, a digital video recorder, a wearable electrical device or an embedded computing system (e.g., computing systems that are part of a vehicle, smart home appliance, consumer electronics product or equipment, manufacturing equipment). In some embodiments, the electrical device 1500 may be any other electronic device that processes data. In some embodiments, the electrical device 1500 may comprise multiple discrete physical components. Given the range of devices that the electrical device 1500 can be manifested as in various embodiments, in some embodiments, the electrical device 1500 can be referred to as a computing device or a computing system.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of embodiments has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

As used in the description of the example embodiments and the appended examples, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

As used herein, the phrase "located on" in the context of a first layer or component located on a second layer or component refers to the first layer or component being directly physically attached to the second part or component (no layers or components between the first and second layers or components) or physically attached to the second layer or component with one or more intervening layers or components.

As used herein, the term "adjacent" may refer to layers or components that are in physical contact with each other. That is, there is no layer or component between the stated adjacent layers or components. For example, a layer X that is adjacent to a layer Y refers to a layer that is in physical contact with layer Y.

As used herein, "B is between A and C" may mean that at least part of B is in or along a space separating at least a part of A and at least a part of C and may mean that the at least part of B is in direct or indirect physical contact with A and/or C but could also include embodiments in which B is not in contact with any part of one or both of A or C.

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," "according to some embodiments," "in accordance with embodiments," or "in embodiments," which may each refer to one or more of the same or different embodiments. Furthermore, the terms "comprising," "including," "having," and the like, as used with respect to embodiments of the present disclosure, are synonymous.

"Coupled" as used herein may mean that two or more elements are in direct physical contact, or that that two or more elements indirectly physically contact each other, but yet still cooperate or interact with each other (e.g., one or more other elements are coupled or connected between the elements that are said to be coupled with each other). The term "directly coupled" means that two or more elements are in direct contact.

As used herein, "A is proximate to B" may mean that A is adjacent to B or A is otherwise near to B.

As used herein, the term "module" refers to being part of, or including an ASIC, an electronic circuit, a system on a chip, a processor (shared, dedicated, or group), a solid state device, a memory (shared, dedicated, or group) that execute one or more software or firmware programs, a combinational logic circuit, and/or other suitable components that provide the described functionality.

As used herein, "electrically conductive" in some examples may refer to a property of a material having an electrical conductivity greater than or equal to 107 Siemens per meter (S/m) at 20 degrees Celsius. Examples of such materials include Cu, Ag, Al, Au, W, Zn and Ni.

In the corresponding drawings of the embodiments, signals, currents, electrical biases, or magnetic or electrical polarities may be represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, polarity, current, voltage, etc, as dictated by design needs or preferences, may actually comprise one or more signals that may travel in either direction and may be implemented with any suitable type of signal scheme.

The terms "substantially," "close," "approximately," "near," and "about," may, in some embodiments, refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

Example 1 includes an apparatus comprising a chip comprising a plurality of micro-emitters, the micro-emitters to couple to a plurality of data lines and to an optical fiber, wherein the micro-emitters are to generate optical signals for parallel transmission through the optical fiber, the optical signals corresponding to data communicated on the data lines.

Example 2 includes the subject matter of Example 1, the chip further comprising first circuitry to generate the data communicated on the data lines.

Example 3 includes the subject matter of any of Examples 1 and 2, and further including a second chip coupled to the chip, the second chip comprising circuitry to generate the data communicated on the data lines.

Example 4 includes the subject matter of any of Examples 1-3, and further including a package substrate coupled to the chip and the second chip.

Example 5 includes the subject matter of any of Examples 1-4, and further including a third chip coupled to the chip and the second chip, the third chip comprising circuitry to convert electrical signals on the data lines to electrical signals suitable to drive the micro-emitters.

Example 6 includes the subject matter of any of Examples 1-5, and further including a bridge embedded in the package substrate, the bridge to couple the second chip to the third chip.

Example 7 includes the subject matter of any of Examples 1-6, and further including a second bridge embedded in the package substrate, the second bridge to couple the third chip to the chip.

Example 8 includes the subject matter of any of Examples 1-7, and wherein the chip is on top of the third chip.

Example 9 includes the subject matter of any of Examples 1-8, and further including a plurality of pillars between the package substrate and a portion of the chip that is not fused to the third chip.

Example 10 includes the subject matter of any of Examples 1-9, and further including a bridge embedded in the package substrate, the bridge to couple the second chip to the chip.

Example 11 includes the subject matter of any of Examples 1-10, and wherein the chip comprises a bridge embedded in a package substrate, the bridge coupled to a second chip, the second chip comprising circuitry to generate the data communicated on the data lines.

Example 12 includes the subject matter of any of Examples 1-11, and further including a bridge embedded in the package substrate, the bridge to directly couple the chip to the third chip and to directly couple the third chip to the second chip.

Example 13 includes the subject matter of any of Examples 1-12, and further including second circuitry to convert data communicated on the data lines to a format suitable to drive the micro-emitters.

Example 14 includes the subject matter of any of Examples 1-13, and wherein a micro-emitter comprises a micro-light emitting diode (micro-LED), organic LED (OLED), quantum dot LED (QLED), vertical-cavity surface-emitting laser (VCSEL), micro-resonant cavity LED (micro-RCLED), nanowire LED, nanopyramid LED, or a stack of a micro-LED and a color conversion quantum dot film.

Example 15 includes a method comprising forming a chip comprising a plurality of micro-emitters, the micro-emitters to couple to a plurality of data lines and to an optical fiber, wherein the micro-emitters are to generate optical signals for parallel transmission through the optical fiber, the optical signals corresponding to data communicated on the data lines.

Example 16 includes the subject matter of Example 15, the chip further comprising first circuitry to generate the data communicated on the data lines.

Example 17 includes the subject matter of any of Examples 15 and 16, and further including forming a second chip coupled to the chip, the second chip comprising circuitry to generate the data communicated on the data lines.

Example 18 includes the subject matter of any of Examples 15-17, and further including coupling a package substrate to the chip and the second chip.

Example 19 includes the subject matter of any of Examples 15-18, and further including forming a third chip coupled to the chip and the second chip, the third chip comprising circuitry to convert electrical signals on the data lines to electrical signals suitable to drive the micro-emitters.

Example 20 includes the subject matter of any of Examples 15-19, and further including forming a bridge embedded in the package substrate, the bridge to couple the second chip to the third chip.

Example 21 includes the subject matter of any of Examples 15-20, and further including forming a second bridge embedded in the package substrate, the second bridge to couple the third chip to the chip.

Example 22 includes the subject matter of any of Examples 15-21, and wherein the chip is on top of the third chip.

Example 23 includes the subject matter of any of Examples 15-22, and further including forming a plurality of pillars between the package substrate and a portion of the chip that is not fused to the third chip.

Example 24 includes the subject matter of any of Examples 15-23, and further including forming a bridge embedded in the package substrate, the bridge to couple the second chip to the chip.

Example 25 includes the subject matter of any of Examples 15-24, and wherein the chip comprises forming a bridge embedded in a package substrate, the bridge coupled to a second chip, the second chip comprising circuitry to generate the data communicated on the data lines.

Example 26 includes the subject matter of any of Examples 15-25, and further including forming a bridge embedded in the package substrate, the bridge to directly couple the chip to the third chip and to directly couple the third chip to the second chip.

Example 27 includes the subject matter of any of Examples 15-26, and further including forming second circuitry to convert data communicated on the data lines to a format suitable to drive the micro-emitters.

Example 28 includes the subject matter of any of Examples 15-27, wherein a micro-emitter comprises a micro-light emitting diode (micro-LED), organic LED (OLED), quantum dot LED (QLED), vertical-cavity surface-emitting laser (VCSEL), micro-resonant cavity LED (micro-RCLED), nanowire LED, nanopyramid LED, or a stack of a micro-LED and a color conversion quantum dot film.

Example 29 includes a system comprising an integrated circuit chip comprising first data lines and second data lines; a plurality of micro-emitters coupled to the integrated circuit chip, the micro-emitters to generate first optical signals for parallel transmission through a first optical fiber, the first optical signals corresponding to data generated by the integrated circuit chip; and a plurality of micro-photodetectors coupled to the integrated circuit chip, the micro-photodetectors to convert second optical signals of a parallel transmission received through a second optical fiber into electrical signals for processing by the integrated circuit chip.

Example 30 includes the subject matter of Example 29, and further including a first connector coupled to the plurality of micro-emitters.

Example 31 includes the subject matter of any of Examples 29 and 30, and wherein the integrated circuit chip comprises at least one of a central processing unit (CPU), a graphics processor, a digital signal processor, a memory chip, or a cryptographic processor.

Example 32 includes the subject matter of any of Examples 29-31, and further including a battery communicatively coupled to the integrated circuit chip, a display communicatively coupled to the integrated circuit chip, or a network interface communicatively coupled to the integrated circuit chip.

Example 33 includes a method comprising forming an integrated circuit chip comprising first data lines and second data lines; forming a plurality of micro-emitters coupled to the integrated circuit chip, the micro-emitters to generate first optical signals for parallel transmission through a first optical fiber, the first optical signals corresponding to data generated by the integrated circuit chip; and forming a plurality of micro-photodetectors coupled to the integrated circuit chip, the micro-photodetectors to convert second optical signals of a parallel transmission received through a second optical fiber into electrical signals for processing by the integrated circuit chip.

Example 34 includes the subject matter of Example 33, and further including coupling a first connector to the plurality of micro-emitters.

Example 35 includes the subject matter of any of Examples 33 and 34, and wherein the integrated circuit chip comprises at least one of a central processing unit (CPU), a graphics processor, a digital signal processor, a memory chip, or a cryptographic processor.

Example 36 includes the subject matter of any of Examples 33-35, and further including communicatively coupling a battery, a display, or a network interface to the integrated circuit chip.

The invention claimed is:

1. An apparatus comprising:
   a chip comprising a plurality of micro-emitters, the micro-emitters to couple to a plurality of data lines and to an optical fiber, wherein the micro-emitters are to generate optical signals for parallel transmission through the optical fiber, the optical signals corresponding to data communicated on the data lines;
   a second chip coupled to the chip, the second chip comprising circuitry to generate the data communicated on the data lines;
   a package substrate coupled to the chip and the second chip; and
   a third chip coupled to the chip and the second chip, the third chip comprising circuitry to convert electrical signals on the data lines to electrical signals suitable to drive the micro-emitters.

2. The apparatus of claim 1, the chip further comprising first circuitry to generate the data communicated on the data lines.

3. The apparatus of claim 1, further comprising a second chip coupled to the chip, the second chip comprising circuitry to generate the data communicated on the data lines.

4. The apparatus of claim 3, further comprising a package substrate coupled to the chip and the second chip.

5. The apparatus of claim 4, further comprising a third chip coupled to the chip and the second chip, the third chip comprising circuitry to convert electrical signals on the data lines to electrical signals suitable to drive the micro-emitters.

6. The apparatus of claim 1, further comprising a bridge embedded in the package substrate, the bridge to couple the second chip to the third chip.

7. The apparatus of claim 6, further comprising a second bridge embedded in the package substrate, the second bridge to couple the third chip to the chip.

8. The apparatus of claim 5, wherein the chip is on top of the third chip.

9. The apparatus of claim 8, further comprising a plurality of pillars between the package substrate and a portion of the chip that is not fused to the third chip, the plurality of pillars comprising a dielectric material.

10. The apparatus of claim 4, further comprising a bridge embedded in the package substrate, the bridge to couple the second chip to the chip.

11. The apparatus of claim 1, wherein the chip comprises a bridge embedded in a package substrate, the bridge coupled to a second chip, the second chip comprising circuitry to generate the data communicated on the data lines.

12. The apparatus of claim 5, further comprising a bridge embedded in the package substrate, the bridge to directly couple the chip to the third chip and to directly couple the third chip to the second chip.

13. The apparatus of claim 3, further comprising second circuitry to convert data communicated on the data lines to a format suitable to drive the micro-emitters.

14. The apparatus of claim 1, wherein a micro-emitter comprises a micro-light emitting diode (LED), organic LED (OLED), or quantum dot LED (QLED), micro-light emitting diode (micro-LED), organic LED (OLED), quantum dot LED (QLED), vertical-cavity surface-emitting laser (VCSEL), micro-resonant cavity LED (micro-RCLED), nanowire LED, nanopyramid LED, or a stack of a micro-LED and a color conversion quantum dot film.

15. A system comprising:
   an integrated circuit chip comprising first data lines and second data lines;
   a second chip comprising a plurality of micro-emitters coupled to the integrated circuit chip, the micro-emitters to generate first optical signals for parallel transmission through a first optical fiber, the first optical signals corresponding to data generated by the integrated circuit chip;
   a package substrate coupled to the integrated circuit chip and the second chip;
   a third chip coupled to the integrated circuit chip and the second chip, the third chip comprising circuitry to convert electrical signals on the first data lines to electrical signals suitable to drive the micro-emitters; and
   a plurality of micro-photodetectors coupled to the integrated circuit chip, the micro-photodetectors to convert second optical signals of a parallel transmission received through a second optical fiber into electrical signals for processing by the integrated circuit chip.

16. The system of claim 15, further comprising a first connector coupled to the plurality of micro-emitters.

17. The system of claim 15, wherein the integrated circuit chip comprises at least one of a central processing unit (CPU), a graphics processor, a digital signal processor, a memory chip, or a cryptographic processor.

18. The system of claim 17, further comprising a battery communicatively coupled to the integrated circuit chip, a display communicatively coupled to the integrated circuit chip, or a network interface communicatively coupled to the integrated circuit chip.

19. A method comprising:
   forming a chip comprising a plurality of micro-emitters, the micro-emitters to couple to a plurality of data lines and to an optical fiber, wherein the micro-emitters are to generate optical signals for parallel transmission through the optical fiber, the optical signals corresponding to data communicated on the data lines;
   coupling an integrated circuit chip to the chip through a package substrate, the integrated circuit chip to generate the data communicated on the data lines;

coupling a third chip to the integrated circuit chip and to the chip, the third chip comprising circuitry to convert electrical signals on the data lines to electrical signals suitable to drive the micro-emitters.

20. The method of claim 19, further comprising forming an integrated circuit chip to generate the data communicated on the data lines and coupling the micro-emitters to the integrated circuit chip.

* * * * *